United States Patent
Curtis et al.

(10) Patent No.: US 10,001,386 B2
(45) Date of Patent: Jun. 19, 2018

(54) AUTOMATIC TRACK SELECTION FOR CALIBRATION OF PEDOMETER DEVICES

(71) Applicant: Apple Inc., Cupertino, CA (US)

(72) Inventors: Robert C. Curtis, Los Gatos, CA (US); Chintan S. Parikh, Santa Clara, CA (US); Hung A. Pham, Oakland, CA (US); Jonathan Beard, Berkeley, CA (US); Gunes Dervisoglu, Mountain View, CA (US)

(73) Assignee: APPLE INC., Cupertino, CA (US)

( * ) Notice: Subject to any disclaimer, the term of this patent is extended or adjusted under 35 U.S.C. 154(b) by 458 days.

(21) Appl. No.: 14/721,941

(22) Filed: May 26, 2015

(65) Prior Publication Data

US 2015/0285659 A1 Oct. 8, 2015

Related U.S. Application Data

(63) Continuation-in-part of application No. PCT/US2014/032805, filed on Apr. 3, 2014.
(Continued)

(51) Int. Cl.
*G01C 22/00* (2006.01)
*G01C 25/00* (2006.01)
*G01S 19/19* (2010.01)

(52) U.S. Cl.
CPC ......... *G01C 22/006* (2013.01); *G01C 25/005* (2013.01); *A63B 2225/02* (2013.01); *G01S 19/19* (2013.01)

(58) Field of Classification Search
None
See application file for complete search history.

(56) References Cited

U.S. PATENT DOCUMENTS 4,855,942 A 8/1989 Bianco
5,117,444 A 5/1992 Sutton et al.
(Continued)

FOREIGN PATENT DOCUMENTS

| CN | 101206124 A | 6/2008 |
| WO | 2000/025090 A1 | 5/2000 |
| WO | 2012/045484 A1 | 4/2012 |
| WO | 2013/068873 A1 | 5/2013 |

OTHER PUBLICATIONS

Cho, Dae-Ki, et al., "AutoGait: A Mobile Platform that Accurately Estimates the Distance Walked," IEEE International Conference on Pervasive Computing and Communications, 2010, pp. 116-124.
(Continued)

*Primary Examiner* — John Kuan
(74) *Attorney, Agent, or Firm* — Kilpatrick Townsend & Stockton, LLP

(57) ABSTRACT

A calibration track to use for pedometer calibration can be automatically selected based on detecting sustained locomotion activity and an ability to obtain and maintain a reliable location fix over a calibration period. Calibration tracks can be generated, rated for quality, and used to compute calibration parameters to convert accelerometer data to stride length and/or distance traveled. Quality of a calibration can be assessed, and old and new calibration parameter sets can be combined based on quality weights assigned to each. Calibration parameters can be separately maintained for different locomotion activities and/or different on-body locations of the pedometers. Pedometer devices can also cooperatively calibrate each other.

17 Claims, 12 Drawing Sheets

Related U.S. Application Data

(60) Provisional application No. 62/005,780, filed on May 30, 2014.

(56) References Cited

U.S. PATENT DOCUMENTS

| | | |
|---|---|---|
| 5,976,083 A | 11/1999 | Richardson et al. |
| 6,145,389 A | 11/2000 | Ebeling et al. |
| 6,619,835 B2 | 9/2003 | Kita |
| 6,658,079 B1 | 12/2003 | Macklin et al. |
| 7,463,997 B2 | 12/2008 | Pasolini et al. |
| 2001/0022828 A1 | 9/2001 | Pyles |
| 2003/0063803 A1 | 4/2003 | Lin et al. |
| 2006/0136173 A1* | 6/2006 | Case, Jr. ............... A63B 24/00 702/182 |
| 2007/0073514 A1 | 3/2007 | Nogimori et al. |
| 2007/0270721 A1 | 11/2007 | Ananny et al. |
| 2011/0003665 A1 | 1/2011 | Burton |
| 2011/0179850 A1 | 7/2011 | Klinnert et al. |
| 2012/0101771 A1 | 4/2012 | Mori |
| 2012/0194676 A1 | 8/2012 | Laganiere |
| 2013/0018581 A1* | 1/2013 | Sidhu ............... G01C 21/16 701/469 |
| 2013/0085677 A1 | 4/2013 | Modi et al. |
| 2013/0085700 A1 | 4/2013 | Modi et al. |
| 2013/0085711 A1 | 4/2013 | Modi et al. |
| 2013/0158686 A1 | 6/2013 | Zhang et al. |
| 2013/0196688 A1 | 8/2013 | Lu et al. |
| 2013/0197857 A1 | 8/2013 | Lu et al. |

OTHER PUBLICATIONS

Boyce, Glenn, et al., "Accuracy of Mobile Phone Pedometer Technology," Journal of Mobile Technology in Medicine, Jun. 2012, vol. 1, Issue 2, 7 pages.

Elyuseev, Dmitry, "Count Your Steps with MEMS: How Pedometers Actually Work," First Line Software online Blog, Feb. 18, 2014, [online], [retrieved on Apr. 5, 2014], Retrieved from the Internet <URL: http://www.firstlinesoftware.com/blogs/count-your-steps-with-mems-how-pedomete . . . >, 3 pages.

Zhao, Neil, "Full-Featured Pedometer Design Realized with 3-Axis Digital Accelerometer," Analog Dialogue, Jun. 2010, vol. 44-06, 5 pages.

Jayalath, Sampath, et al., "A Gyroscopic Data based Pedometer Algorithm," 8th International Conference on Computer Science & Education (ICCSE 2013), 2013, at Colombo, Sri Lanka, Malaysia, 5 pages.

Lee, Seon-Woo, et al., "Activity and Location Recognition Using Wareable Sensors," Pervasive Computing, 2002, 9 pages.

Libby, Ryan, "A simple method for reliable footstep detection on embedded sensor platforms," Jun. 25, 2008, 16 pages.

Martin, Henar, et al., "Enhancing Activity Recognition by Fusing Inertial and Biometric Information," 14th International Conference on Information Fusion, Jul. 5-8, 2011, Chicago, IL, 8 pages.

Sun, Lin, et al., "Activity Recognition on an Accelerometer Embedded Mobile Phone with Varying Positions and Orientations," 2010, www-public.tem-tsp.eu, 15 pages.

Vega-Corona, A., et al., "Design of the Approximation Function of a Pedometer Based on Artificial Neural Network for the Healthy Life Style Promotion in Diabetic Patients," 2008 Seventh Mexican International Conference on Artificial Intelligence, Oct. 1, 2008, pp. 325-329.

Garmin, "Forerunner 405CX Owner's Manual," Mar. 1, 2009, [online], [retrieved on Jul. 7, 2010], retrieved from the internet, <URL: http://www8.garmin.com/manuals/Forefunner405CX_OwnersManual.pdf, 55 pages.

International Search Report and Written Opinion, dated Mar. 19, 2015 in PCT/US2014/032805, 21 pages.

\* cited by examiner

AUTOMATIC TRACK SELECTION FOR CALIBRATION OF PEDOMETER DEVICES

CROSS-REFERENCE TO RELATED APPLICATION

This application is a continuation-in-part of International Patent Application No. PCT/US2014/032805, filed Apr. 3, 2014. This application also claims the benefit of U.S. Provisional Application No. 62/005,780, filed May 30, 2014. The disclosures of both applications are incorporated herein by reference in their entirety.

BACKGROUND

The present disclosure relates generally to electronic pedometers and in particular to automatic track selection for calibration of a pedometer device.

Medical science has established that regular physical activity is important to maintaining good health. Regrettably, however, the advancement of technology has generally coincided with a reduction of physical activity. Instead of having to earn a living through physically demanding labor, many people today find that their daily routine consists largely of sitting in front of a computer or television screen, punctuated by intervals of sitting in a car in traffic. Physical activity has, for many, become another chore to be scheduled and carried out or, as is often the case, forgotten entirely.

Among those who do seek out exercise, there is often a desire to quantify their performance. Runners and walkers, for instance, want to know how far they go and/or how many steps they take while exercising. Pedometers, devices that detect and measure step count and/or distance traveled, can be a useful tool for such individuals.

SUMMARY

One challenge faced by any pedometer is that of determining distance traveled. Many electronic pedometers require the user to measure and enter a stride length or step length (in general usage, a "stride" refers to two consecutive steps), which the pedometer can use to convert a measured step count to distance. Other electronic pedometers may collect other personal data (e.g., the user's height, weight, and gender) from which a stride length can be inferred. Such pedometers, even if they are accurate as to step count, can be quite inaccurate as to distance covered. For example, measuring stride length can be difficult, and the user's stride length can change over time. Inferences from other personal data are generally even less reliable than a direct measurement. In addition, depending on where on the user's body a pedometer is worn, the step count can be subject to varying degrees of inaccuracy, making performance data less reliable.

Certain embodiments of the present invention relate to electronic pedometer devices that can be calibrated transparently to the user using other pedometer devices that the user happens to be wearing. For example, a first pedometer can be incorporated into a wearable device (e.g., a wrist-worn device or other device attached to the user's person) while a second pedometer is incorporated into another device (e.g., a smart phone or other mobile electronic device) that the user might carry in a pocket or wear on a belt or the like during a workout. The pedometer devices can communicate with each other to initiate a calibration period, during which data regarding acceleration (or motion), step count and/or user location is gathered. After the calibration period, one or both of the devices can use the data to compute calibration parameters, such as a correction to a step count, a conversion factor for converting step count to distance traveled, and or a set of calibration parameters to convert accelerometer or other motion-sensor data to distance traveled.

Certain embodiments of the present invention relate to facilitating calibration operations that are transparent to the user by automatically selecting a calibration track to use for calibration. For example, a pedometer device can automatically detect when the user is engaged in a sustained locomotion activity, e.g., distinguishing a short burst of energy from sustained activity such as a workout. When sustained locomotion activity is detected, the pedometer device can activate a GPS receiver (or other location-determining technology), which can be internal or external to the pedometer device, to track the user's location. Based on the quality of the location data and/or the degree to which the user sustains the activity over an appropriate distance or time period, a determination can be made whether to accept the set of location and pedometry data collected during that time period as a calibration track. If the calibration track is accepted, calibration can proceed, using the location data to determine distance traveled and pedometry data (e.g., accelerometer data) to determine steps or strides. Calibration parameters for converting pedometry data to number of strides and stride length measurements can be determined. Newly determined calibration parameters can be combined with previously determined calibration parameters using a weighted averaging technique. For example, the new calibration parameters can be assigned a weight based on the quality of the calibration track (e.g., reliability of the location data, consistency of the user's cadence, etc.). The previous calibration parameters can be assigned a quality weight as well, and a weighted average can be computed. To assign a quality weight to the resulting updated calibration parameters, a distance can be computed for the calibration track using the updated calibration parameters, and the quality weight can be a function of how accurately the computed distance matches a "true" track length determined from the location data. A pedometer device that has its own GPS receiver (or other location-determining technology) can be calibrated in this manner without the aid of any other devices. A pedometer device that does not have location-determining technology can be calibrated in this manner in coordination with another device that does have location-determining technology or that otherwise has a reliable capability to determine distance traveled (e.g., a second pedometer that has been previously calibrated for the same user).

In some embodiments, a pedometer device can be calibrated separately for multiple different activities (e.g., walking, jogging, running, swimming, wheelchair racing, rowing, or any other user locomotion activity). For example, the pedometer device can distinguish among activities based on data received from its internal motion sensors and can store separate sets of calibration parameters, each set associated with a different activity. During calibration, the identified activity can be used to select which set of calibration parameter should be updated, and at other times, the identified activity can be used to select which set of calibration parameters should be applied.

In some embodiments, a pedometer device can be worn or carried on different portions of a user's body, such as the waist, upper arm, lower arm, or handheld, and the user may wear or carry the pedometer on different portions at different times. Where this is the case, the pedometer can be separately calibrated for different on-body locations as well as for different locations. Thus, a pedometer might have, for example one set of calibration parameters for walking while on the user's waist, another set for running while on the user's waist, another set for walking while on the user's upper arm, and so on. In some embodiments, the pedometer can automatically determine its on-body location while a locomotion activity is in progress and select the appropriate set of calibration parameters to apply and/or to update.

The following detailed description together with the accompanying drawings will provide a better understanding of the nature and advantages of the present invention.

DETAILED DESCRIPTION

Figure 1:
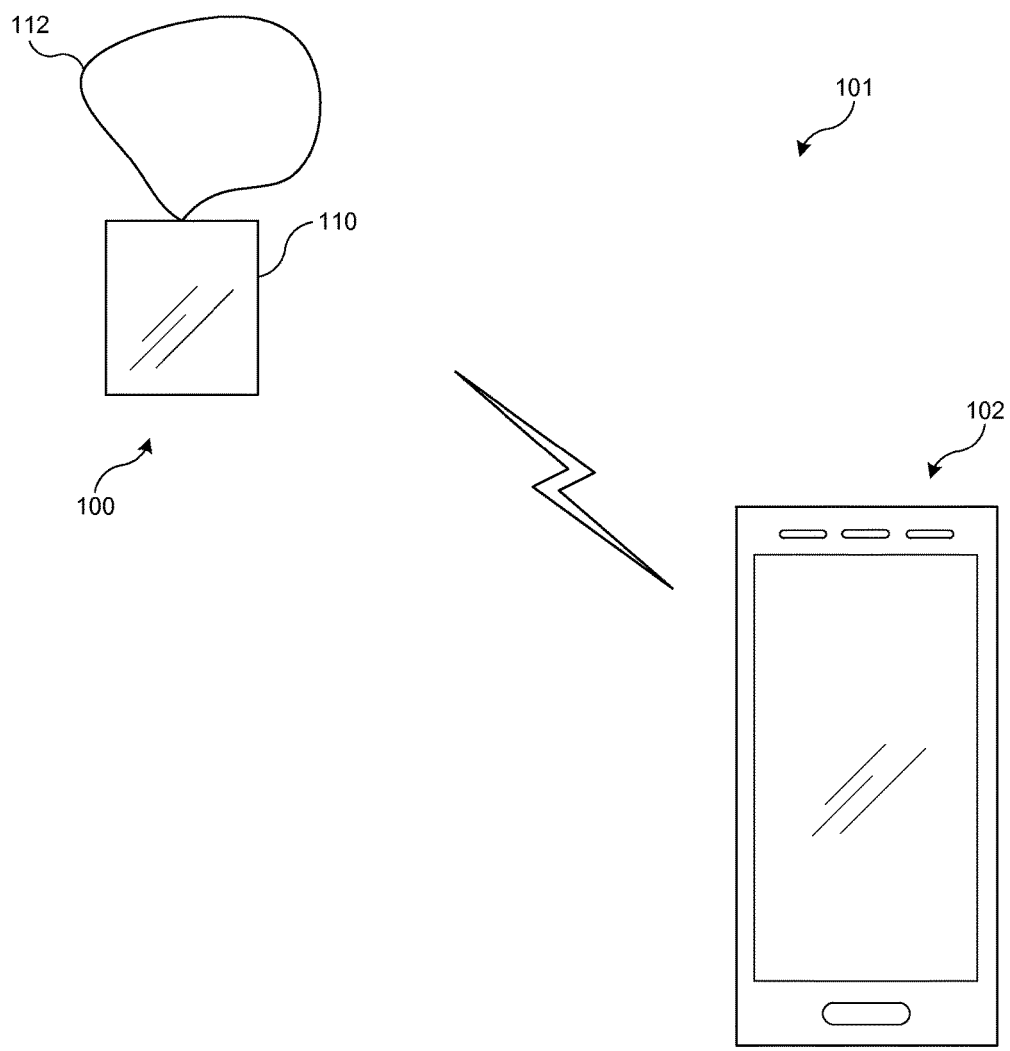
FIG. 1 shows a wearable device communicating wirelessly with a host device according to an embodiment of the present invention.

Certain embodiments of the present invention relate to electronic pedometer devices that can be calibrated transparently to the user using other pedometer devices that the user happens to be wearing. For example, a first pedometer can be incorporated into a wearable device (e.g., a wrist-worn device or other device attached to the user's person) while a second pedometer is incorporated into another device (e.g., a smart phone or other mobile electronic device) that the user might carry in a pocket or wear on a belt or the like during a workout. The pedometer devices can communicate with each other to initiate a calibration period, during which data regarding step count and/or user location is gathered. After the calibration period, one or both of the devices can use the data to compute calibration parameters, such as a correction to a step count and/or a conversion factor for converting step count to distance traveled.

Certain embodiments of the present invention relate to facilitating calibration operations that are transparent to the user by automatically selecting a calibration track to use for calibration. For example, a pedometer device can automatically detect when the user is engaged in a sustained locomotion activity, e.g., distinguishing a short burst of energy from sustained activity such as a workout. When sustained locomotion activity is detected, the pedometer device can activate a GPS receiver (or other location-determining technology), which can be internal or external to the pedometer device, to track the user's location. Based on the quality of the location data and/or the degree to which the user sustains the activity over an appropriate distance or time period, a determination can be made whether to accept the set of location and pedometry data collected during that time period as a calibration track. If the calibration track is accepted, calibration can proceed, using the location data to determine distance traveled and pedometry data (e.g., accelerometer data) to determine steps or strides. Calibration parameters for converting pedometry data to number of strides and stride length measurements can be determined. Newly determined calibration parameters can be combined with previously determined calibration parameters using a weighted averaging technique. For example, the new calibration parameters can be assigned a weight based on the quality of the calibration track (e.g., reliability of the location data, consistency of the user's cadence, etc.). The previous calibration parameters can be assigned a quality weight as well, and a weighted average can be computed. To assign a quality weight to the resulting updated calibration parameters, a distance can be computed for the calibration track using the updated calibration parameters, and the quality weight can be a function of how accurately the computed distance matches a "true" track length determined from the location data. A pedometer device that has its own GPS receiver (or other location-determining technology) can be calibrated in this manner without the aid of any other devices. A pedometer device that does not have location-determining technology can be calibrated in this manner in coordination with another device that does have location-determining technology or that otherwise has a reliable capability to determine distance traveled (e.g., a second pedometer that has been previously calibrated for the same user).

In some embodiments, pedometers can be implemented in wearable and/or portable electronic devices. FIG. 1 shows a system 101 comprising a wearable device 100 communicating wirelessly with a host device 102 according to an embodiment of the present invention. Wearable device 100 and host device 102 can each incorporate a pedometer. As used herein, pedometry includes any measurement of a user's locomotion activity (e.g., walking, jogging, running, rowing, wheelchair racing, or any other activity by which users can propel themselves through space via body movement); pedometers can measure parameters such as a step count (in activities where the user's legs are propelling the user), an arm stroke count (in activities where the user's arms are propelling the user), and/or a distance traveled by the user during a locomotion activity.

Wearable device 100 can be, for example, a necklace, a wristband, a bracelet, a watch, eyeglasses or other eyewear, a headband, a ring, etc. Wearable device 100 can include an active component 110 and an attachment member 112. Active component 110 can include various physiological sensors, motion sensors, and/or other environmental sensors; user input devices (e.g., control buttons, knobs, and/or dials; touch sensor or touch screen; microphone); and/or user output devices (e.g., display, speakers, haptic devices). In addition, active component 110 can include a communication interface, such as a wireless communication interface, that supports exchange of information between wearable device 100 and host device 102.

Attachment member 112 can allow the user to wear device 100 attached to the user's person or clothing. For example, attachment member 112 can include a strap or chain to allow attachment to the user's wrist or wearing around the user's neck, an ear piece to support wearing of device 100 on the user's head, a clip or pin to support attachment of device 100 to an article of clothing that the user wears, and so on. In some embodiments, attachment member 112 can also incorporate active electronic components such as sensors, user interface components, data communication interfaces, and the like. In some embodiments, attachment member 112 can be designed to be detachable by the user from device 100.

In some embodiments, active component 110 can determine whether wearable device 100 is being worn at any given time, e.g., based on sensor data and/or signals from attachment member 112. Wearable device 100 can operate differently depending on whether it is currently being worn or not. For example, wearable device 100 can inactivate various user interface and/or RF interface components when it is not being worn. In addition, in some embodiments, wearable device 100 can notify host device 102 when a user puts on or takes off wearable device 100.

Host device 102 can be any device that communicates with wearable device 100. In FIG. 1, host device 102 is shown as a smart phone; however, other host devices can be substituted, such as a tablet computer, a media player, any type of mobile phone, a laptop or desktop computer, or the like. Host device 102 can communicate wirelessly with wearable device 100, e.g., using protocols such as Bluetooth or Wi-Fi. In some embodiments, wearable device 100 can include an electrical connector that can be used to provide a wired connection to host device 102 and/or to other devices, e.g., by using suitable cables. For example, a connector can be used to connect to a power supply to charge an onboard battery of wearable device 100.

In some embodiments, wearable device 100 and host device 102 can interoperate to enhance functionality available on host device 102. For example, wearable device 100 and host device 102 can establish a pairing using a wireless communication technology such as Bluetooth. While the devices are paired, host device 102 can send notifications of selected events (e.g., receiving a phone call, text message, or email message) to wearable device 100, and wearable device 100 can present corresponding alerts to the user. Wearable device 100 can also provide an input interface via which a user can respond to an alert (e.g., to answer a phone call or reply to a text message). In some embodiments, wearable device 100 can also provide a user interface that allows a user to initiate an action on host device 102, such as placing a phone call, sending a text message, or controlling media playback operations of host device 102. As another example, wearable device 100 and host device 102 can each incorporate a pedometer, which can be any component(s) that enable measurement of a user's locomotion activity (e.g., step count, stroke count, distance traveled). For instance, in some embodiments described below, a pedometer can include one or more accelerometers and/or other motion sensors operating in combination with processing circuitry that implements algorithms to identify steps or arm strokes based on data from the sensors. In other embodiments, a pedometer can include distance-measuring circuitry, e.g. using GPS or the like to determine how far the user has traveled.

It will be appreciated that wearable device 100 and host device 102 are illustrative and that variations and modifications are possible. For example, wearable device 100 can be implemented in any wearable article, including a watch, a bracelet, a necklace, a ring, a belt, a jacket, or the like. In some instances, wearable device 100 can be a clip-on device or pin-on device that has a clip or pin portion that attaches to the user's clothing. Active component 110 can be attached to the clip or pin portion by a retractable cord, and a user can access active component 110 by pulling on it, then let go to return active component 110 to its resting location. Thus, a user can wear device 100 in any convenient location.

Figure 2:
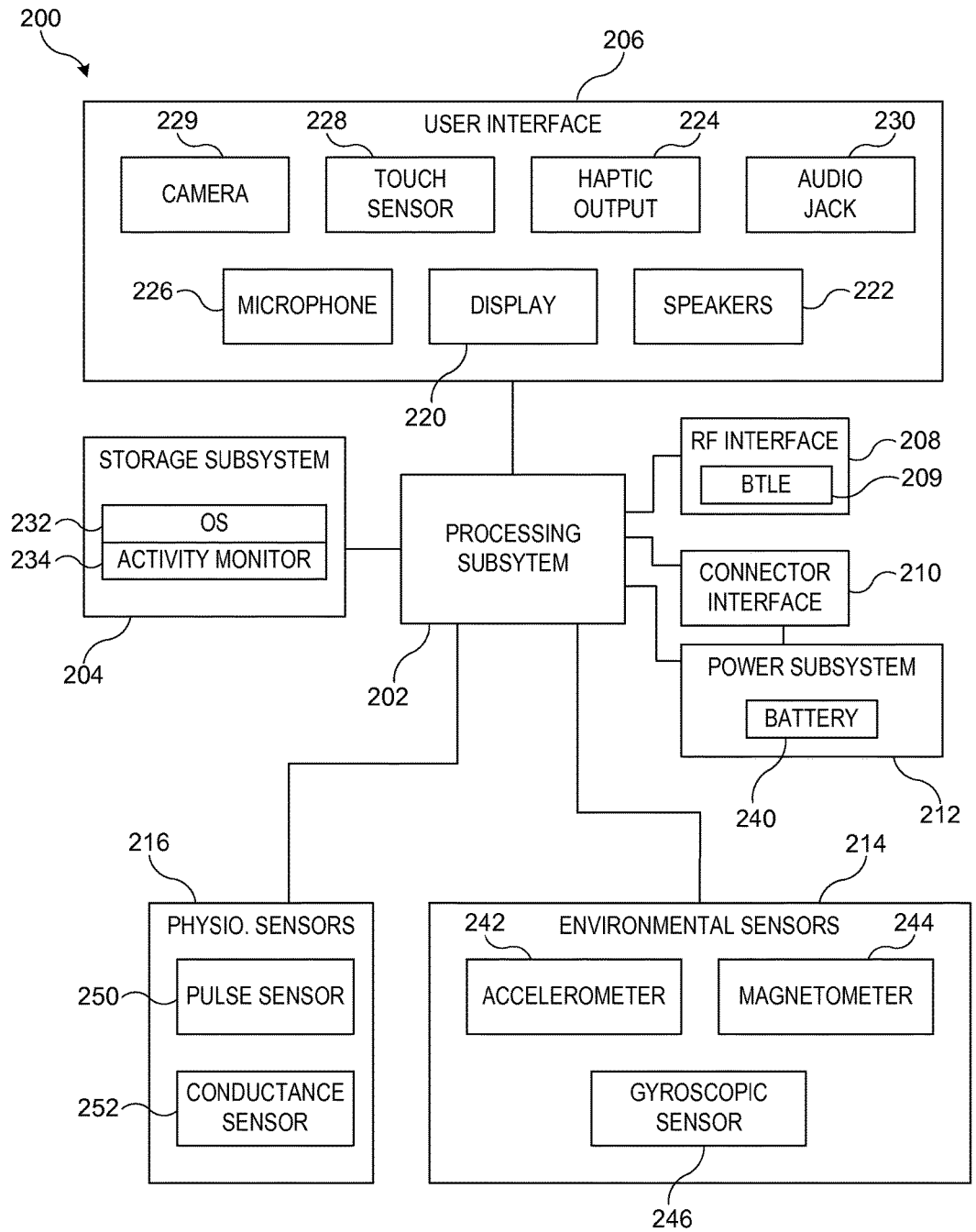
FIG. 2 is a simplified block diagram of a wearable device according to an embodiment of the present invention.

Wearable device 100 can incorporate various electronic components. FIG. 2 is a simplified block diagram of a wearable device 200 (e.g., implementing wearable device 100) according to an embodiment of the present invention. Wearable device 200 can include processing subsystem 202, storage subsystem 204, user interface 206, RF interface 208, connector interface 210, power subsystem 212, environmental sensors 214, and physiological sensors 216. Wearable device 200 can also include other components (not explicitly shown).

Storage subsystem 204 can be implemented, e.g., using magnetic storage media, flash memory, other semiconductor memory (e.g., DRAM, SRAM), or any other non-transitory storage medium, or a combination of media, and can include volatile and/or non-volatile media. In some embodiments, storage subsystem 204 can store media items such as audio files, video files, image or artwork files; information about a user's contacts (names, addresses, phone numbers, etc.); information about a user's calendar (e.g., scheduled appointments and events; notes; and/or other types of information, examples of which are described below. In some embodiments, storage subsystem 204 can also store one or more application programs to be executed by processing subsystem 202 (e.g., video game programs, personal information management programs, media playback programs, fitness and/or wellness related programs, interface programs associated with particular host devices and/or host device functionalities, etc.).

User interface 206 can include any combination of input and output devices. A user can operate input devices of user interface 206 to invoke the functionality of wearable device 200 and can view, hear, and/or otherwise experience output from wearable device 200 via output devices of user interface 206.

Examples of output devices include display 220, speakers 222, and haptic output generator 224. Display 220 can be implemented using compact display technologies, e.g., LCD (liquid crystal display), LED (light-emitting diode), OLED (organic light-emitting diode), or the like. In some embodiments, display 220 can incorporate a flexible display element or curved-glass display element, allowing wearable device 200 to conform to a desired shape. One or more speakers 222 can be provided using small-form-factor speaker technologies, including any technology capable of converting electronic signals into audible sound waves. In some embodiments, speakers 222 can be used to produce tones (e.g., beeping or ringing) and can but need not be capable of reproducing sounds such as speech or music with any particular degree of fidelity. Haptic output generator 224 can be, e.g., a device that converts electronic signals into vibrations; in some embodiments, the vibrations can be strong enough to be felt by a user wearing wearable device 200 but not so strong as to produce distinct sounds.

Examples of input devices include microphone 226, touch sensor 228, and camera 229. Microphone 226 can include any device that converts sound waves into electronic signals. In some embodiments, microphone 226 can be sufficiently sensitive to provide a representation of specific words spoken by a user; in other embodiments, microphone 226 can be usable to provide indications of general ambient sound levels without necessarily providing a high-quality electronic representation of specific sounds.

Touch sensor 228 can include, e.g., a capacitive sensor array with the ability to localize contacts to a particular point or region on the surface of the sensor and in some instances, the ability to distinguish multiple simultaneous contacts. In some embodiments, touch sensor 228 can be overlaid over display 220 to provide a touchscreen interface, and processing subsystem 202 can translate touch events (including taps and/or other gestures made with one or more contacts) into specific user inputs depending on what is currently displayed on display 220.

Camera 229 can include, e.g., a compact digital camera that includes an image sensor such as a CMOS sensor and optical components (e.g. lenses) arranged to focus an image onto the image sensor, along with control logic operable to use the imaging components to capture and store still and/or video images. Images can be stored, e.g., in storage subsystem 204 and/or transmitted by wearable device 200 to other devices for storage. Depending on implementation, the optical components can provide fixed focal distance or variable focal distance; in the latter case, autofocus can be provided. In some embodiments, camera 229 can be disposed along an edge of face member, e.g., top edge, and oriented to allow a user to capture images of nearby objects in the environment such as a bar code or QR code. In other embodiments, camera 229 can be disposed on the front surface of face member 104, e.g., to capture images of the user. Zero, one, or more cameras can be provided, depending on implementation.

In some embodiments, user interface 206 can provide output to and/or receive input from an auxiliary device such as a headset. For example, audio jack 230 can connect via an audio cable (e.g., a standard 2.5-mm or 3.5-mm audio cable) to an auxiliary device. Audio jack 230 can include input and/or output paths. Accordingly, audio jack 230 can provide audio to the auxiliary device and/or receive audio from the auxiliary device. In some embodiments, a wireless connection interface can be used to communicate with an auxiliary device.

Processing subsystem 202 can be implemented as one or more integrated circuits, e.g., one or more single-core or multi-core microprocessors or microcontrollers, examples of which are known in the art. In operation, processing subsystem 202 can control the operation of wearable device 200. In various embodiments, processing subsystem 202 can execute a variety of programs in response to program code and can maintain multiple concurrently executing programs or processes. At any given time, some or all of the program code to be executed can be resident in processing subsystem 202 and/or in storage media such as storage subsystem 204.

Through suitable programming, processing subsystem 202 can provide various functionality for wearable device 200. For example, in some embodiments, processing subsystem 202 can execute an operating system (OS) 232 and various applications (also referred to as apps) for interfacing with a host device, such as an activity monitoring app 234 that can incorporate pedometer operations (e.g., analyzing motion-sensor data to determine a step count and/or providing information such as a step count and/or distance traveled to the user). In some embodiments, some or all of these application programs can interact with a host device, e.g., by generating messages to be sent to the host device and/or by receiving and interpreting messages from the host device. In some embodiments, some or all of the application programs can operate locally to wearable device 200. For example, activity monitoring app 234 can collect and locally store activity-related information such as heart rate, step count, or the like, and such information can be presented to a user, e.g., via display 220. Activity monitoring app 234 can also communicate with other devices when such devices are available, e.g., for purposes of pedometer calibration and/or sharing activity data between devices. Examples of pedometer calibration processes are described below.

RF (radio frequency) interface 208 can allow wearable device 200 to communicate wirelessly with various host devices. RF interface 208 can include RF transceiver components 209 such as an antenna and supporting circuitry to enable data communication over a wireless medium, e.g., using Wi-Fi (IEEE 802.11 family standards), Bluetooth® (a family of standards promulgated by Bluetooth SIG, Inc.), or other protocols for wireless data communication. RF interface 208 can be implemented using a combination of hardware (e.g., driver circuits, antennas, modulators/demodulators, encoders/decoders, and other analog and/or digital signal processing circuits) and software components. In some embodiments, RF interface 208 can provide near-field communication ("NFC") capability, e.g., implementing the ISO/IEC 18092 standards or the like; NFC can support wireless data exchange between devices over a very short range (e.g., 20 centimeters or less). Multiple different wireless communication protocols and associated hardware can be incorporated into RF interface 208.

Connector interface 210 can allow wearable device 200 to communicate with various host devices via a wired communication path, e.g., using Universal Serial Bus (USB), universal asynchronous receiver/transmitter (UART), or other protocols for wired data communication. In some embodiments, connector interface 210 can provide a power port, allowing wearable device 200 to receive power, e.g., to charge an internal battery. For example, connector interface 210 can include a connector such as a mini-USB connector or a custom connector, as well as supporting circuitry.

In some embodiments, connector interface 210 and/or RF interface 208 can be used to support synchronization operations in which data is transferred from a host device (e.g., host device 102 of FIG. 1) to wearable device 200 (or vice versa). For example, while user interface 206 can support data-entry operations, a user may find it more convenient to enter data using a different device (e.g., a tablet or smartphone) that has a larger interface (e.g., including a real or virtual alphanumeric keyboard), then transfer the data to wearable device 200 via a synchronization operation. Synchronization operations can also be used to load and/or update other types of data in storage subsystem 204, such as media items, application programs, and/or operating system programs, as well as to transfer data (e.g., activity data gathered by activity monitor 234) from storage subsystem 204 to other devices. Synchronization operations can be performed in response to an explicit user request and/or automatically, e.g., when wireless device 200 resumes communication with a particular host device or in response to either device receiving an update to its copy of synchronized information.

Environmental sensors 214 can include various electronic, mechanical, electromechanical, optical, or other devices that provide information related to external conditions around wearable device 200. Sensors 214 in some embodiments can provide digital signals to processing subsystem 202, e.g., on a streaming basis or in response to polling by processing subsystem 202 as desired. Any type and combination of environmental sensors can be used; shown by way of example are accelerometer 242, a magnetometer 244, a gyroscope 246, and a GPS receiver 248.

Some environmental sensors can provide information about the location and/or motion of wearable device 200. For example, accelerometer 242 can sense acceleration (relative to freefall) along one or more axes, e.g., using piezoelectric or other components in conjunction with associated electronics to produce a signal. Magnetometer 244 can sense an ambient magnetic field (e.g., Earth's magnetic field) and generate a corresponding electrical signal, which can be interpreted as a compass direction. Gyroscopic sensor 246 can sense rotational motion in one or more directions, e.g., using one or more MEMS (micro-electro-mechanical systems) gyroscopes and related control and sensing circuitry.

Other sensors can also be included in addition to or instead of these examples. For example, a sound sensor can incorporate microphone 226 together with associated circuitry and/or program code to determine, e.g., a decibel level of ambient sound. Temperature sensors, proximity sensors, ambient light sensors, or the like can also be included.

Physiological sensors 216 can include various electronic, mechanical, electromechanical, optical, chemical or other devices that provide information about the physiological status of a user. For instance, a pulse sensor 250 can detect a user's pulse based on pressure changes against a pressure sensor, electrical impulses, or the like. In some embodiments, pulse sensor 250 can include an optical sensor and can provide pulse oximetry data (both heart rate and oxygen content of the blood). A skin conductance sensor 252 can measure changes in the user's skin conductance that may indicate sweating, stress, or the like. Other types of sensors can also be used, including temperature sensors, ECG sensors, and so on. In device 100 of FIG. 1, physiological sensors can be disposed inside and/or on inward-facing surfaces of either or both of attachment member 112 and/or active component 110.

Power subsystem 212 can provide power and power management capabilities for wearable device 200. For example, power subsystem 212 can include a battery 240 (e.g., a rechargeable battery) and associated circuitry to distribute power from battery 240 to other components of wearable device 200 that require electrical power. In some embodiments, power subsystem 212 can also include circuitry operable to charge battery 240, e.g., when connector interface 210 is connected to a power source. In some embodiments, power subsystem 212 can include a "wireless" charger, such as an inductive charger, to charge battery 240 without relying on connector interface 210. In some embodiments, power subsystem 212 can also include other power sources, such as a solar cell, in addition to or instead of battery 240.

In some embodiments, power subsystem 212 can control power distribution to components within wearable device 200 to manage power consumption efficiently. For example, power subsystem 212 can automatically place device 200 into a "hibernation" state when sensors 216 or other sensors indicate that device 200 is not being worn. The hibernation state can be designed to reduce power consumption; accordingly, user interface 206 (or components thereof), RF interface 208, connector interface 210, and/or environmental sensors 214 can be powered down (e.g., to a low-power state or turned off entirely), while sensors 216 or certain other sensors are powered up (either continuously or at intervals) to detect when a user puts on wearable device 200. As another example, in some embodiments, while wearable device 200 is being worn, power subsystem 212 can turn display 220 and/or other components on or off depending on motion and/or orientation of wearable device 200 detected by environmental sensors 214. For instance, if wearable device 200 is designed to be worn on a user's wrist, power subsystem 212 can detect raising and rolling of a user's wrist, as is typically associated with looking at a wristwatch, based on information provided by accelerometer 242. In response to this detected motion, power subsystem 212 can automatically turn display 220 and/or touch sensor 228 on; similarly, power subsystem 212 can automatically turn display 220 and/or touch sensor 228 off in response to detecting that user's wrist has returned to a neutral position (e.g., hanging down).

Power subsystem 212 can also provide other power management capabilities, such as regulating power consumption of other components of wearable device 200 based on the source and amount of available power, monitoring stored power in battery 240, generating user alerts if the stored power drops below a minimum level, and so on.

In some embodiments, control functions of power subsystem 212 can be implemented using programmable or controllable circuits operating in response to control signals generated by processing subsystem 202 in response to program code executing thereon, or as a separate microprocessor or microcontroller.

It will be appreciated that wearable device 200 is illustrative and that variations and modifications are possible. For example, wearable device 200 can include a user-operable control (e.g., a button or switch) that the user can operate to indicate when wearable device 200 is being worn. Controls can also be provided, e.g., to turn on or off display 220, mute or unmute sounds from speakers 222, etc. Wearable device 200 can include any types and combination of sensors and in some instances can include multiple sensors of a given type.

In various embodiments, a user interface can include any combination of any or all of the components described above, as well as other components not expressly described. For example, in some embodiments, the user interface can include, e.g., just a touchscreen, or a touchscreen and a speaker, or a touchscreen and a haptic device. Where the wearable device has an RF interface, a connector interface can be omitted, and all communication between the wearable device and other devices can be conducted using wireless communication protocols. A wired power connection, e.g., for charging a battery of the wearable device, can be provided separately from any data connection.

Further, while the wearable device is described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software.

Figure 3:
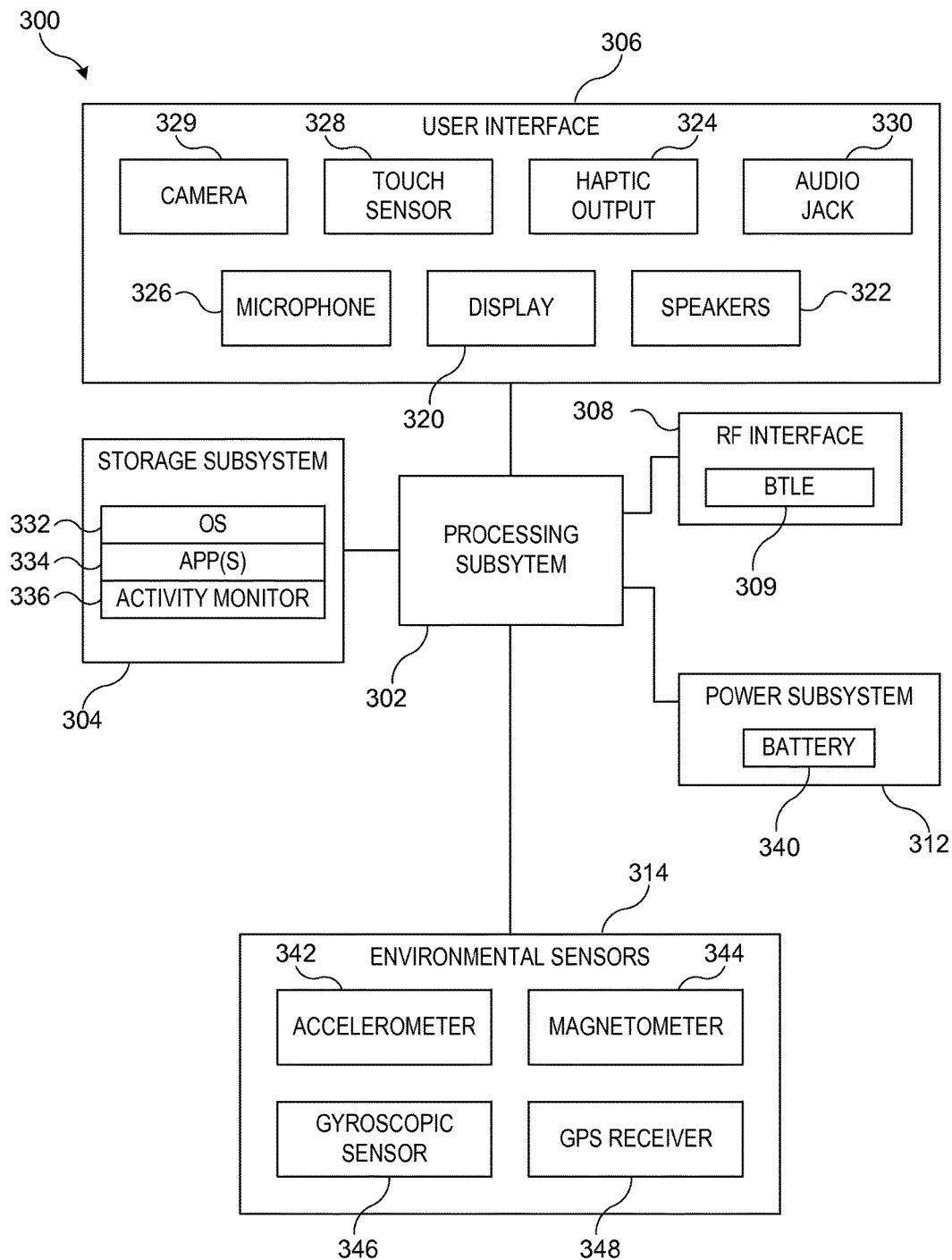
FIG. 3 is a simplified block diagram of a host device according to an embodiment of the present invention.

A host device such as host device 102 of FIG. 1 can be implemented as an electronic device using blocks similar to those described above (e.g., processors, storage media, user interface devices, data communication interfaces, etc.) and/or other blocks or components. FIG. 3 is a simplified block diagram of a host device 300 (e.g., implementing host device 102 of FIG. 1) according to an embodiment of the present invention. Host device 300 can include processing subsystem 302, storage subsystem 304, user interface 306, RF interface 308, power subsystem 312, and environmental sensors 314. Host device 300 can also include other components (not explicitly shown). Many of the components of host device 300 can be similar or identical to those of wearable device 200 of FIG. 2.

For instance, storage subsystem 304 can be generally similar to storage subsystem 204 and can include, e.g., using magnetic storage media, flash memory, other semiconductor memory (e.g., DRAM, SRAM), or any other non-transitory storage medium, or a combination of media, and can include volatile and/or non-volatile media. Like storage subsystem 204, storage subsystem 304 can be used to store data and/or program code to be executed by processing subsystem 302.

User interface 306 can include any combination of input and output devices. A user can operate input devices of user interface 306 to invoke the functionality of host device 300 and can view, hear, and/or otherwise experience output from host device 300 via output devices of user interface 306. Examples of output devices include display 320, speakers 322, and haptic output generator 324. Examples of input devices include microphone 326, touch sensor 328, audio jack 330, and camera 329. These input and output devices can be similar to output devices described above with reference to FIG. 2.

Processing subsystem 302 can be implemented as one or more integrated circuits, e.g., one or more single-core or multi-core microprocessors or microcontrollers, examples of which are known in the art. In operation, processing system 302 can control the operation of host device 300. In various embodiments, processing subsystem 302 can execute a variety of programs in response to program code and can maintain multiple concurrently executing programs or processes. At any given time, some or all of the program code to be executed can be resident in processing subsystem 302 and/or in storage media such as storage subsystem 304.

Through suitable programming, processing subsystem 302 can provide various functionality for host device 300. For example, in some embodiments, processing subsystem 302 can execute an operating system (OS) 332 and various applications 334 such as a phone-interface application, a text-message-interface application, a media interface application, a fitness application, and/or other applications. In some embodiments, some or all of these application programs can interact with a wearable device, e.g., by generating messages to be sent to the wearable device and/or by receiving and interpreting messages from the wearable device. In some embodiments, some or all of the application programs can operate locally to host device 300.

Processing subsystem 302 can also execute activity monitoring code 336 (which can be part of OS 332 or separate as desired). In some embodiments, activity monitoring code 336 can incorporate pedometer operations (e.g., analyzing motion-sensor data to determine a step count, analyzing location data to determine a distance traveled, and/or providing information such as a step count and/or distance traveled to the user). In some embodiments, activity monitoring code 336 can communicate with other devices (e.g., wearable device 100 of FIG. 1) when such devices are available, e.g., for purposes of pedometer calibration and/or sharing activity data between devices. Examples of pedometer calibration processes are described below.

RF (radio frequency) interface 308 can allow host device 300 to communicate wirelessly with various other devices and networks. RF interface 308 can include RF transceiver components such as an antenna and supporting circuitry to enable data communication over a wireless medium, e.g., using cellular voice and/or data networks, Wi-Fi (IEEE 802.11 family standards), Bluetooth® (a family of standards promulgated by Bluetooth SIG, Inc.), or other protocols for wireless data communication. In some embodiments, RF interface 308 can implement a Bluetooth LE (Low energy) proximity sensor 309 that supports proximity detection through an estimation of signal strength and/or other protocols for determining proximity to another electronic device. In some embodiments, RF interface 308 can provide near-field communication ("NFC") capability, e.g., implementing the ISO/IEC 18092 standards or the like; NFC can support wireless data exchange between devices over a very short range (e.g., 20 centimeters or less). RF interface 308 can be implemented using a combination of hardware (e.g., driver circuits, antennas, modulators/demodulators, encoders/decoders, and other analog and/or digital signal processing circuits) and software components. Multiple different wireless communication protocols and associated hardware can be incorporated into RF interface 308.

Environmental sensors 314 can include various electronic, mechanical, electromechanical, optical, or other devices that provide information related to external conditions around host device 300. Sensors 314 in some embodiments can provide digital signals to processing subsystem 302, e.g., on a streaming basis or in response to polling by processing subsystem 302 as desired. Any type and combination of environmental sensors can be used; shown by way of example are accelerometer 342, a magnetometer 344, a gyroscope 346, and a Global Positioning System (GPS) receiver 348. Accelerometer 342, magnetometer 344, and gyroscope 346 can operate similarly to corresponding sensors in wearable device 200 described above. GPS receiver 348 can determine location based on signals received from GPS satellites, e.g., using known techniques. Other sensors can also be included in addition to or instead of these examples, such as temperature sensors, proximity sensors, ambient light sensors, ambient sound (or noise) sensors, or the like.

Power subsystem 312 can provide power and power management capabilities for host device 300. For example, power subsystem 312 can include a battery 340 (e.g., a rechargeable battery) and associated circuitry to distribute power from battery 340 to other components of host device 300 that require electrical power. In some embodiments, power subsystem 312 can also include circuitry operable to charge battery 340, e.g., when an electrical connector (not shown) is connected to a power source. In some embodiments, power subsystem 312 can include a "wireless" charger, such as an inductive charger, to charge battery 340 without relying on a physical connector. In some embodiments, power subsystem 312 can also include other power sources, such as a solar cell, in addition to or instead of battery 340.

In some embodiments, power subsystem 312 can control power distribution to components within host device 300 to manage power consumption efficiently. For example, when host device 300 is in an inactive state (not interacting with a user), power subsystem 312 can place device 300 into a low-power state, e.g., by powering off various components of user interface 306, RF interface 308, and/or environmental sensors 314. Power subsystem 312 can also provide other power management capabilities, such as regulating power consumption of other components of host device 300 based on the source and amount of available power, monitoring stored power in battery 340, generating user alerts if the stored power drops below a minimum level, and so on.

In some embodiments, control functions of power subsystem 312 can be implemented using programmable or controllable circuits operating in response to control signals generated by processing subsystem 302 in response to program code executing thereon, or as a separate microprocessor or microcontroller.

It will be appreciated that host device 300 is illustrative and that variations and modifications are possible. In various embodiments, other controls or components can be provided in addition to or instead of those described above. Any device capable of interacting with a wearable device as described herein can be a host device.

Further, while the host device is described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software. It is also not required that every block in FIG. 3 be implemented in a given embodiment of a host device.

Communication between a host device and a wearable device can be implemented according to any communication protocol (or combination of protocols) that both devices are programmed or otherwise configured to use. In some instances, standard protocols such as Bluetooth protocols can be used. In some instances, a custom message format and syntax (including, e.g., a set of rules for interpreting particular bytes or sequences of bytes in a digital data transmission) can be defined, and messages can be transmitted using standard serial protocols such as a virtual serial port defined in certain Bluetooth standards. Embodiments of the invention are not limited to particular protocols, and those skilled in the art with access to the present teachings will recognize that numerous protocols can be used.

In accordance with certain embodiments of the present invention, wearable device 100 can provide electronic pedometer functionality and can monitor a user's activity, e.g., the number of steps taken while the user is exercising or going about daily activity. For example, in the implementation shown in FIG. 2, wearable device 200 can include various motion sensors such as accelerometer 242 (e.g., a three-axis accelerometer) and/or gyroscopic sensor 246 that can be used to detect motion of the user's arm or wrist or other part of the user's body. The detected motion can be correlated with the user's steps as the user walks or jogs or runs. Similarly, host device 102 can also provide electronic pedometer functionality that can overlap with pedometer functionality of wearable device 100. For example, in the implementation shown in FIG. 3, host device 300 can include various motion sensors such as accelerometer 342 (e.g., a three-axis accelerometer) and/or gyroscopic sensor 346 that can be used to detect motion of whatever part of the user's body host device 300 happens to be attached to (e.g., the user's waist or hip or arm).

Figure 4:
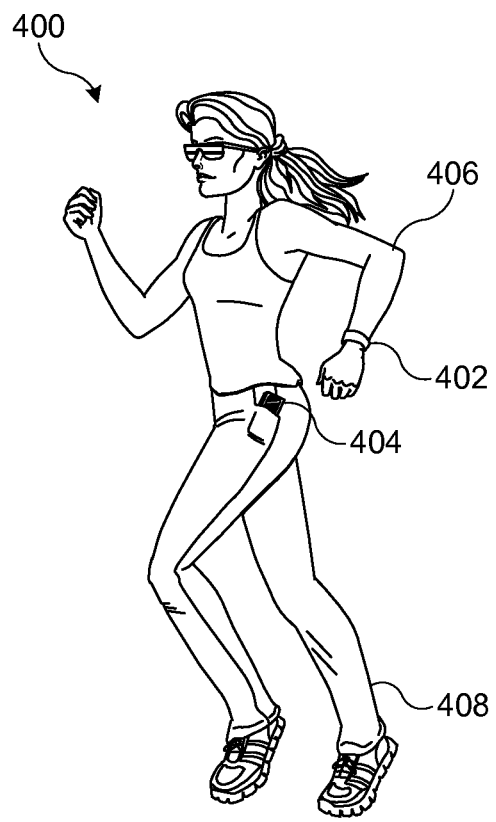
FIG. 4 shows a user engaged in an activity while wearing a wearable device and another mobile device according to an embodiment of the present invention.

FIG. 4 shows a user 400 wearing wearable device 402 (which can be the same as or similar to wearable device 100 of FIG. 1 and implemented similarly to device 200 to FIG. 2) and another mobile device 404 (which can be the same as or similar to host device 102 of FIG. 1 and implemented similarly to device 300 of FIG. 3) while engaged in activity, in this case running. To the extent that some component of the motion of the user's arms 406 correlates with the motion of the user's legs 408, wearable device 402 can analyze the detected motion of arms 406 to determine the number of strides or steps taken. The analysis can be done in real time and can use known algorithms.

Wearable device 402 can be subject to inaccuracy. For instance, during a run, user 400 might occasionally interrupt or alter her arm movement, e.g., to look at a display of wearable device 402, which can show heart rate, duration of the run, step count, distance, or other information. In addition, the user's arm motions might not correlate exactly with leg motions. Consequently, the number of steps counted by wearable device 402 might not always match the actual number of steps taken. In addition, many users are interested in the distance they cover during a workout, not just a step count. For such reasons, it can be desirable to calibrate the pedometer provided by wearable device 402.

Accordingly, in certain embodiments of the present invention, mobile device 404 (which can be any device that the user can wear or carry during a workout while also wearing wearable device 402) can provide calibration information for wearable device 402. For example, auxiliary pedometer device 404 can be a mobile device, such as a mobile phone, that user 400 can carry during a workout. Auxiliary pedometer device 404 can be carried by the user, e.g., by being placed in the user's pocket, clipped to a belt, or the like.

Mobile device 404 can provide data usable to calibrate the pedometer function of wearable device 402. For example, mobile device 404 can include its own motion sensors (e.g., accelerometers and/or gyroscopes as shown in FIG. 3) and can determine its own step count for the user, independently of wearable device 402. Additionally or alternatively, mobile device 404 can include sensors capable of determining its current location and/or the distance traveled. For instance, mobile device 404 can include a GPS receiver (as shown in FIG. 3) capable of receiving and interpreting signals from a network of GPS satellites orbiting the earth in order to determine its current location; by determining location repeatedly (e.g., every few seconds) while the user is moving, mobile device 404 can determine a distance traveled during the workout.

In some embodiments, calibration data from mobile device 404 can be used to improve the accuracy of a step count or distance determined by wearable device 402. For example, the forces associated with the impact of taking a step travel up the user's leg 408. The user's arms 406 can add additional degrees of freedom that may mask the effect of impact forces from the accelerometers of wearable device 402. If mobile device 404 is worn on the user's leg or hip (e.g., in a pocket or attached to a belt) or waist or torso, mobile device 404 can experience these forces more directly than wearable device 402 and consequently can provide a more reliable step count. In addition or instead, if mobile device 404 has location-determining capability (e.g., a GPS receiver), mobile device 404 can determine a distance traveled. During a calibration process, the user can wear or carry both device 402 and device 404. As described below, devices 402 and 404 can communicate to allow wearable device 402 to determine calibration parameters, such as a correction factor to correct its step count, a conversion factor to convert step count to distance traveled, or other parameters to convert measured acceleration data to distance traveled and/or step count.

In some embodiments, calibration can only occur when both devices are on the user's person during an activity. However, calibration need not require any other user action beyond the simple fact of wearing or carrying both devices. As described below, the devices themselves can determine when to calibrate and can perform the calibration transparently to the user. Further, as described below, some pedometer devices that include a GPS receiver (or other location-determining technology) can be "self-calibrating," meaning that carrying a second device is not required in order to calibrate the pedometer.

It is also not required that the user always wear or carry both devices when doing an activity. For example, once wearable device 402 has been calibrated during a first instance of doing an activity, device 402 can use its calibration parameters to convert measured accelerations to a step count and/or distance traveled during any subsequent instance of doing the same activity, regardless of whether mobile device 404 is present. Similarly, if wearable device 402 is not present during an instance of doing an activity, mobile device 404 can operate to measure acceleration and determine step count and/or distance traveled using its own sensors. In some embodiments, calibration can occur during any instance of doing an activity when both devices are present; when only one device is present, that device can independently determine a step count and/or distance traveled (e.g., based on the most recent calibration data).

Figure 5:
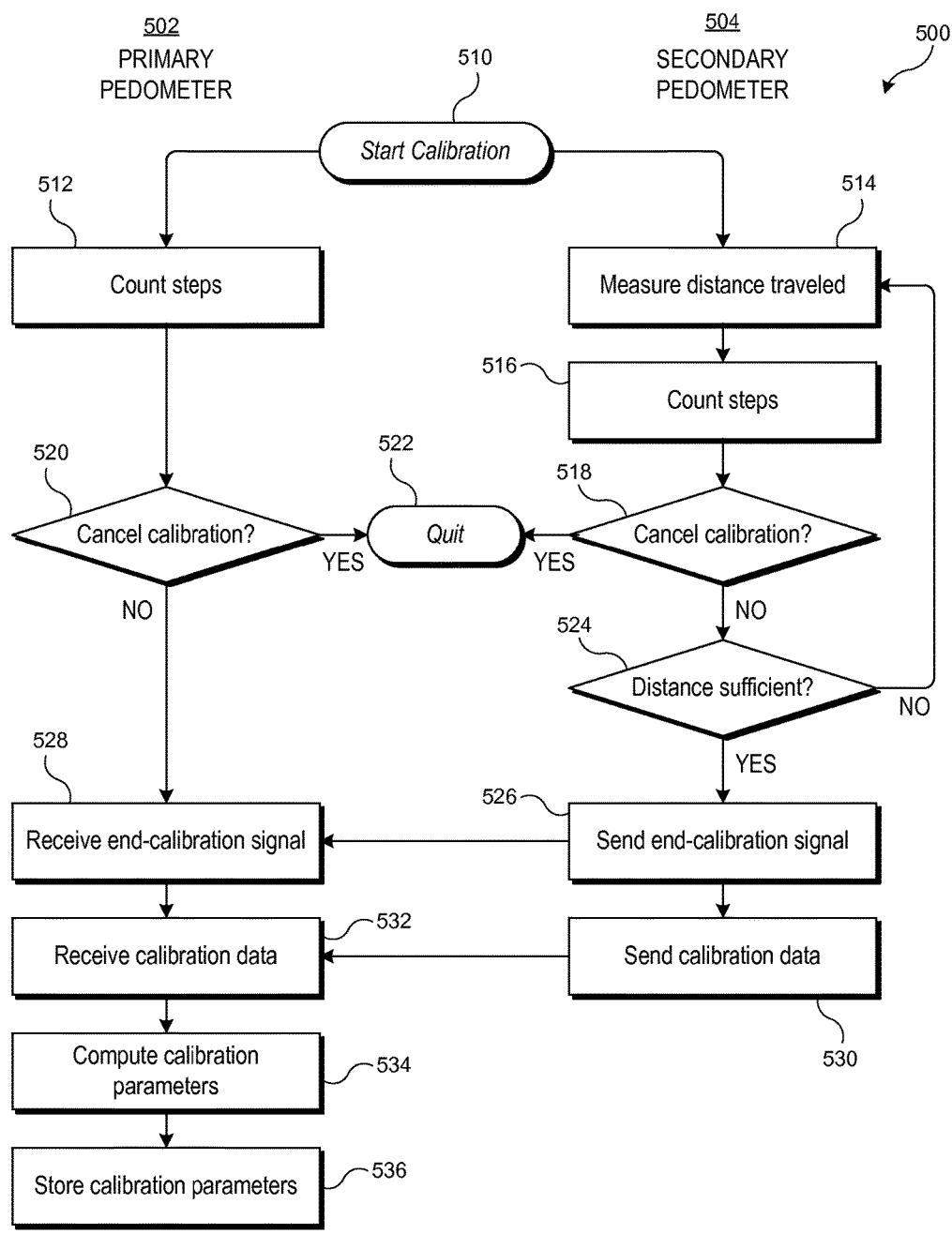
FIG. 5 is a flow diagram of a calibration process according to an embodiment of the present invention.

Examples of calibration processes will now be described. FIG. 5 is a flow diagram of a calibration process 500 according to an embodiment of the present invention. Portions of process 500 can be executed by a primary pedometer device 502 (i.e., the device that is to be calibrated) while other portions can be executed by a secondary pedometer device 504 (i.e., a different device that provides calibration data to calibrate primary pedometer device 502). For example, primary pedometer device 502 can be wearable device 402 of FIG. 4, while secondary pedometer device 504 can be mobile device 404 of FIG. 4. Process 500 can be performed at any time when primary pedometer device 502 and secondary pedometer device 504 are in communication with each other (e.g., paired via Bluetooth and within communication range).

At block 510, primary pedometer device 502 and secondary pedometer device 504 can begin a calibration period in response to an initiation event. A calibration period can be initiated in various ways. In some embodiments, the user can expressly request calibration, e.g., by interacting with the user interface of one or the other of devices 502, 504, and the request can be communicated from the device that receives the user request to the other device. As another example, one of the devices can automatically detect that the user is engaged in an activity for which pedometer calibration is relevant and can signal the other device (assuming the other device is present) to begin calibration. Further examples of initiating a calibration period are described below, and any of these examples can be implemented at block 510. Beginning a calibration period at block 510 can include synchronizing the start of the calibration period such that both devices gather the data to be used in the calibration operation (e.g., step counts and/or location information) during the same time interval. Synchronization need not be exact; an accuracy of a few milliseconds can be sufficient.

During the calibration period, at block 512, primary pedometer device 502 can count the steps taken by the user. For example, primary pedometer device 502 can include an accelerometer or other motion sensor (e.g., as shown in FIG. 2), and block 512 can include analyzing the motion sensor data to detect events corresponding to taking a step. Such events can include, for example, a cyclic pattern of accelerations consistent with swinging an arm in time with the user's strides, a transient rapid change in acceleration indicative of an impact and rebound with a surface, and/or other patterns or combinations of patterns. In some embodiments, primary pedometer device 502 can receive signals from sensors located elsewhere on the user's person, such as a pressure or acceleration sensor placed in or on the user's shoe; any such sensor signals can be used to determine a step count, e.g., in combination with the motion sensor data of primary pedometer device 502.

At block 514, secondary pedometer device 504 can measure the distance traveled during the calibration period. For example, device 504 can include a GPS receiver (e.g., as shown in FIG. 3); by polling the receiver periodically (e.g., every second or every few seconds), device 504 can determine the user's current location and how far the user has traveled since the last location determination. Thus, even if the user is running on a track or around a block, distance traveled can be determined. At block 516, secondary pedometer device 504 can count the user's steps, e.g., using its internal motion sensors. In some embodiments, secondary pedometer device 504 can receive signals from sensors located elsewhere on the user's person, such as a pressure or acceleration sensor placed in or on the user's shoe; any such sensor signals can be used to determine a step count, e.g., in combination with the motion sensor data of secondary pedometer device 504.

In some embodiments, calibration can be canceled by either pedometer device, at blocks 518 and 520. For example, if primary pedometer device 502 (or secondary pedometer device 504) detects that the user has stopped doing the activity, primary pedometer device 502 can send a signal to secondary pedometer device 504 (or vice versa) indicating that the activity has stopped. As another example, if secondary pedometer device 504 becomes unable to reliably determine location or distance, device 504 can cancel the calibration operation. If either device determines that calibration should be canceled, it can send a cancellation signal to the other device, and both devices can end the calibration operation at block 522.

Assuming the calibration operation is not canceled, at block 524, secondary pedometer device 504 can determine whether a sufficient distance has been traveled, e.g., based on the distance measurements at block 514. A "sufficient distance" can be any distance that is long enough to provide a reliable calibration, based on assumptions about the effect of inaccuracy or statistical fluctuations in distance measurements and/or step counts within secondary pedometer device 504 and/or primary pedometer device 502. For example, in some embodiments, a sufficient distance can be 0.25 miles, 0.5 kilometers, or the like. A calibration period initiated at block 510 can continue until canceled (blocks 518, 520) or until a sufficient distance is traveled at block 524.

Once a sufficient distance has been traveled, at block 526, secondary pedometer device 504 can send an end-calibration signal to primary pedometer device 502, and primary pedometer device 502 can receive the end-calibration signal at block 528. Communication of the end-calibration signal can result in both devices ceasing to update the calibration data being collected. For example, each of devices 502, 504 can save its current step count as a final calibration step count, and secondary pedometer device 504 can save the current distance traveled as a final calibration distance traveled. As with the start of calibration, the end of calibration can be synchronized such that both devices cease gathering data to be used in the calibration operation (e.g., step counts and/or location information) at the same time. This synchronization need not be exact; an accuracy of a few milliseconds can be sufficient. The user can be, but need not be, alerted that the calibration interval has ended. If the user continues the activity beyond the calibration interval, either or both devices can continue counting steps, measuring distance, and/or gathering other data, but any such subsequent data can be ignored for purposes of calibration process 500. Thus, the beginning and ending of a calibration interval can be transparent to the user.

At block 530, secondary pedometer device 504 can send calibration data to primary pedometer device 502, and primary pedometer device 502 can receive the calibration data at block 532. In various embodiments, the calibration data can include a number of steps ($S_{C2}$) counted during the calibration interval by second pedometer device 504 and/or a distance traveled ($D_{C2}$) during the calibration interval as measured by second pedometer device 504.

At block 534, primary pedometer device 502 can compute calibration parameters using the data received at block 530 and its own calibration data, such as the number of steps ($S_{C1}$) counted during the calibration period by primary pedometer device 502. At block 536, primary pedometer device 502 can store the calibration parameters for subsequent use.

Various calibration parameters can be computed and stored. For example, a calibration parameter can be used to compute distance traveled based on step count. In some embodiments, a distance calibration factor $\delta$ can be computed as $\delta = D_{C2}/S_{C1}$.

Once computed, distance calibration factor $\delta$ can be stored by primary pedometer device 502 and subsequently used to determine the distance traveled during user activity outside a calibration period. For instance, if device 502 determines a step count ($S_O$) for a workout, then the distance traveled ($D_O$) during the workout can be computed as $D_O = S_O * \delta$.

As another example, in some embodiments, primary pedometer device 502 can be wearable on a user's wrist, where the correlation of accelerations or other detected motions with a user's steps may not be as exact as it is for a pedometer located on a user's torso, waist, or leg. More generally, secondary pedometer device 504 may provide a more accurate or reliable step count than primary pedometer device 502. Accordingly, a calibration parameter can be used to correct the step count measured by primary pedometer device 502. For example, a step-count calibration factor $\sigma$ can be computed as $\sigma = S_{C2}/S_{C1}$.

Once computed, step-count calibration factor $\sigma$ can subsequently be used to correct step counts measured during user activity outside a calibration period. For instance, if device 502 determines a step count ($S_O$) for a workout, then the corrected step count ($C_O$) can be computed as $C_O = S_O * \sigma$.

In some embodiments, a step-count calibration factor $\sigma$ can be computed first, and the distance calibration factor $\delta$ can be computed based on the corrected step count. Other calibration parameters can also be defined.

It will be appreciated that calibration process 500 is illustrative and that variations and modifications are possible. Steps described as sequential may be executed in parallel, order of steps may be varied, and steps may be modified, combined, added or omitted. Either device can initiate or end a calibration process. In some embodiments, primary pedometer device 502 can provide its calibration data to secondary pedometer device 504, and secondary pedometer device 504 can compute calibration parameters for primary device 502. The particular calibration parameters and definitions can be different from those described above. Further, in some embodiments, a calibration interval can be defined by reference to time rather than distance traveled (e.g., the calibration interval can have a fixed duration such as 1 minute, 2 minutes, 5 minutes, or any other duration).

Additional procedures and algorithms can be used to determine whether to accept calibration parameters computed at block 534. For instance, the distance calibration factor $\delta$ defined above generally reflects a user's step length or stride length, and consequently the value of $\delta$ can be expected to be within a certain range (e.g., about 0.3 to 2 meters for a single step, or about 0.5 to 4 meters for a stride) based on human anatomy and the nature of the activity (e.g., walking versus running).

In some embodiments, rather than assigning a constant or average step or stride length, a calibration process can correlate characteristics of accelerometer data with step or stride length and determine, e.g., a stride length for each stride based on the accelerometer data. That is, a stride length for a particular stride can be defined as $L = f(A)$, where A denotes a set of accelerometer data collected during that stride. Calibration can include adjusting various parameters defining the function $f( )$.

By way of illustration, accelerometer data can be sampled as a function of time, and a set of accelerometer data samples over some sampling period (e.g., 3 seconds, 5 seconds) can be used to define a per-stride stride length L. For example, the following characteristics can be defined over the sampling period:

$c_1$=fourth root of acceleration range;
$c_2$=RMS acceleration;
$c_3$=mean absolute differential value;
$c_4$=average cross threshold;
$c_5$=cadence (e.g., in strides per second or steps per second);
$c_6$=average dominant frequency;
$c_7$=total signal energy; and
$c_8$=frequency domain entropy.

Characteristics $c_1$-$c_4$ can be determined in the time domain, while characteristics $c_5$-$c_8$ can be determined in the frequency domain (e.g., by performing a Fast Fourier Transform or the like on the accelerometer samples).

A linear combination of characteristics $c_1$-$c_8$ can be defined as a stride length for each stride in the sampling period t:

$$L(t) = w_0 + \Sigma_{i=1}^{8} w_i c_i(t), \qquad (1)$$

where $w_0$-$w_8$ are weights that can be calibrated. With weights $w_0$-$w_8$ held constant, L(t) will vary due to stride-to-stride variations in the user's motion. The total distance covered in a series of sampling periods from t=0 to t=T can be defined as:

$$D = \Sigma_{t=0}^{T} L(t) S(t), \qquad (2)$$

where S(t) is the number of strides detected during time period t.

Calibration can be performed by determining values for the weights $w_0$-$w_8$ over a known time period during which the user travels a known distance (e.g., $D_{C2}$ as measured by secondary pedometer 504) and using the accelerometer data measured over that time period. For example, at block 512 of process 500, primary pedometer 502 can collect and save accelerometer data (or a representation thereof, such as characteristics $c_1$-$c_8$) during the calibration period, in addition to counting steps. At block 532, primary pedometer 502 can receive the total distance traveled as measured by secondary pedometer 504. Using Equations (1) and (2) and linear regression algorithms, primary pedometer 502 can determine values for weights $w_0$-$w_8$. The linear regression can be initialized or constrained based on various biometric assumptions. For example, based on cadence and/or other properties of the accelerometer data, primary pedometer 502 can determine the user's gait (e.g., walking or running), and default assumptions about stride length for a particular gait can be used to initialize or constrain the linear regression (e.g., assuming a default stride length of about 0.75 meters, and a maximum stride length of 1.0 meters for walking and 2.0 meters for running) These assumptions can be further tailored based on specific biometric characteristics of the user such as height, weight, and/or gender if such characteristics are provided to primary pedometer 502. Once weights $w_0$-$w_8$ have been calibrated, Equations (1) and (2) can be used to determine distance traveled during any period of time when primary pedometer 502 is operating.

As another example, it is contemplated that process 500 can be performed multiple times during the same workout or during different workouts that may be separated by days or weeks. Calibration parameter values determined from different instances of executing process 500 can be used to validate new parameter values (e.g., rejecting new parameter values with implausibly large deviations from previous values). In some embodiments, parameter values determined from different instances of executing process 500 can be averaged to determine the parameter values to be used. If desired, the average can be weighted in favor of more recent instances.

In some embodiments, when process 500 is performed multiple times, each calibration period can be assigned a reliability score. For instance, secondary pedometer 504 can determine a reliability score based on factors such as straightness of the path traveled during the calibration period (straighter path correlates with higher score), variance in the user's pace during the calibration period (less variance correlates with higher score), and total distance traveled during the calibration period (longer distance correlates with higher score), and the reliability score can be provided to primary pedometer 502 along with the distance data. Calibration parameters determined from different calibration periods can be averaged using weights based on the reliability scores.

In some embodiments, a user can engage in multiple different activities for which use of a pedometer may be desirable. For instance, the user may walk sometimes and jog or run sometimes. Process 500 or similar processes can be used to calibrate the same pedometer device 502 separately for different locomotion activities, and a set of calibration parameters can be associated with a specific activity. In some instances, the algorithms used to estimate step count and/or distance based on accelerometer signals can also depend on the locomotion activity. Accordingly, a pedometer device such as device 502 (or any of the devices shown in FIGS. 1-4) can store multiple sets of calibration parameters (e.g., a walking calibration and a running calibration), and at any given time, device 502 can apply, or update, the calibration parameters (and algorithms) that best match the user's current activity.

The activity can be manually indicated by the user or automatically inferred by one or both of the pedometer devices. For example, a pattern of accelerations associated with walking can be distinguished from a pattern associated with running, e.g., based on stronger impacts and/or stronger pushoff forces that generally occur when a user is running, step rate or stride rate (which are typically higher for running than for walking), and so on. In some embodiments, an activity classifier algorithm can be trained (e.g., using machine learning techniques) to distinguish among different locomotion activities, and the output of the activity classifier can be used to automatically select an appropriate step-count or distance algorithms and calibration parameters.

Calibration can occur under various conditions. In some embodiments, the user can manually instruct either pedometer device to initiate calibration. Additionally or alternatively, the devices themselves can determine when to initiate calibration, e.g., based on their own motion sensor data (which can indicate when the user is engaged in an activity appropriate for pedometry) in combination with the presence of another pedometer device. Some embodiments can also take into account additional information such as when calibration most recently occurred, whether the current time coincides with a regular or scheduled workout or activity period of the user, and so on.

Figure 6:
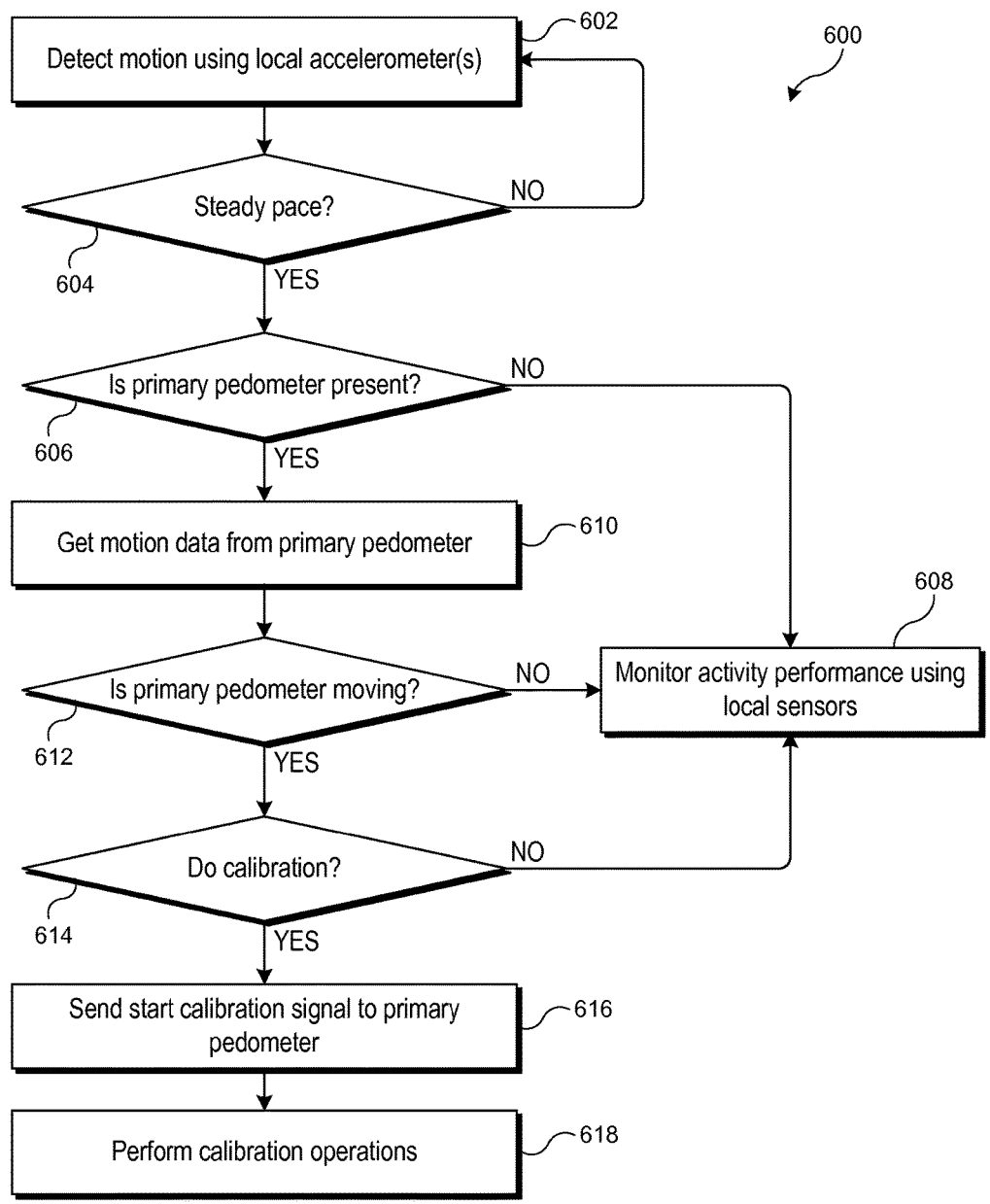
FIG. 6 is a flow diagram of a process for determining when calibration should occur according to an embodiment of the present invention.

FIG. 6 is a flow diagram of a process 600 for determining when calibration should occur according to an embodiment of the present invention. In the example described, process 600 can be performed by secondary pedometer device 504 of FIG. 5 (i.e., a device that provides calibration reference data to calibrate another device); however, in other embodiments, process 600 or similar processes can be performed by primary pedometer device 502 (i.e., a device that is to be calibrated).

At block 602, secondary pedometer device 504 can detect motion, e.g., using its onboard accelerometers and/or other motion sensors. At block 604, secondary pedometer device 504 can analyze the motion-sensor data to determine whether a workout or other activity appropriate for pedometry is in progress. For example, heuristic analysis algorithms known in the art (such as activity classifier algorithms) can be used to determine whether a user is walking, running, jogging, or the like. Device 504 can further determine whether the activity is progressing at a fairly steady pace over some period of time such as two minutes or the like. For example, a user might sprint across a street, then slow down; this variation in pace can indicate that calibration at the present time is not suitable. A burst of activity can be distinguished from a user who is running or jogging for exercise, who will tend to take steps at an approximately constant rate for a more sustained period.

At block 606, which can be reached when an activity is in progress at a fairly steady pace, secondary pedometer device 504 can determine whether another pedometer device in need of calibration (e.g., primary pedometer device 502) is present. For example, secondary pedometer device 504 can determine whether it is currently paired with and able to communicate with another device that has pedometer capability (e.g., primary pedometer device 502). If not, then at block 608, secondary pedometer device 504 can monitor the user's activity using its local sensors (e.g., accelerometer, location sensor) to track the user's performance. For instance, device 504 can determine a step count and/or distance traveled during the workout. It is to be understood that either primary pedometer device 502 or secondary pedometer device 504 can be used as a standalone pedometer if the other device is not present during an activity.

If primary pedometer device 502 is present, then at block 610, secondary pedometer device 504 can obtain motion data from primary pedometer device 502 (e.g., by sending a request). In some embodiments, primary pedometer device 502 can send a representation of the motion sensor data (e.g., digitally-sampled sensor data) to secondary pedometer device 504. In other embodiments, primary pedometer device 502 can send data representing an analysis of the motion sensor data. For example, similarly to secondary pedometer device 504, primary pedometer device 502 can use heuristic algorithms to determine the user's current activity; at block 610, primary pedometer device 502 can provide data indicating the current activity (e.g., walking at 100 steps per minute).

At block 612, secondary pedometer device 504 can determine whether primary pedometer device 502 is also moving with the user. For example, secondary pedometer device 504 can compare its own motion-sensor data (raw or analyzed) to data received at block 610. As another example, if primary pedometer device 502 and/or secondary pedometer device 504 implements a proximity-detecting technology (e.g., Bluetooth LE proximity detection), either device can determine whether the distance between the two devices is increasing, decreasing or remaining constant over a suitable time interval (e.g., a few seconds, long enough to average out relative movement of different body parts). If primary pedometer device 502 is not moving with secondary pedometer device 504, then calibration at the present time is not appropriate, and secondary pedometer device 504 can monitor the user's activity using its local sensors at block 608.

At block 614, if primary pedometer device 502 is present and moving along with secondary pedometer device 504, then secondary pedometer device 504 can determine whether to perform a calibration option. For example, secondary pedometer device 504 can determine when calibration was last performed (e.g., based on its own stored information or on information provided by primary pedometer device 502). If a calibration was performed recently (e.g., within the last day or last week) for the current type of activity, then a new calibration may not be particularly useful, and calibration can be deferred to another occasion. If no calibration has been performed recently, or if recent calibrations had a low reliability score, then calibration may be desirable. In various embodiments, other conditions can also be considered. For instance, calibration can be desirable if the user's pattern of activity has changed (e.g., becoming more active or less active), or if the user's gait has changed (e.g., longer or shorter strides, uneven strides indicative of injury), or if other changes occur. As another example, if the user works out at a regular time, calibration can be performed during the regular workout time. In some embodiments, a regular workout time can be determined, e.g., based on monitoring the user's activity over time (e.g., detecting a pattern such as the user running for 30 minutes on Mondays, Wednesdays, and Saturdays), based on the user's calendar (e.g., the user regularly schedules a workout), and/or any other information about the user's schedule and habits. In some embodiments, the determination whether to calibrate can be based on any data available to secondary pedometer device 504, including data obtained from primary pedometer device 502, and in some embodiments, calibration can be performed whenever the user is engaged in an appropriate activity and primary pedometer device 502 and secondary pedometer device 504 are present and moving together.

In some embodiments, if block 614 results in determining that calibration is not to be performed, secondary pedometer device 504 can still monitor the user's activity using its local sensors at block 608. In other embodiments, secondary pedometer device 504 does not monitor activity if primary pedometer device 502 is present unless a calibration is to be performed. (This can reduce power consumption by secondary pedometer device 502.)

If, at block 614, a calibration is to be performed, then at block 616, secondary pedometer device 504 can send a start calibration signal to primary pedometer device 502. Sending and receiving of this signal can correspond to the begin calibration event at block 510 of process 500 described above. Thereafter, at block 618, calibration operations (e.g., according to process 500) can be performed.

It will be appreciated that process 600 described herein is illustrative and that variations and modifications are possible. Steps described as sequential may be executed in parallel, order of steps may be varied, and steps may be modified, combined, added or omitted. Process 600 can be performed at any time. In some embodiments, process 600 can be performed repeatedly while the user is engaged in an activity; thus, calibration can occur at any time during an activity. For example, it may be desirable to calibrate once during a warm-up period when the user is beginning the activity and again at a later point when the user may be exerting a higher level of effort. Or it may be desirable to defer calibrate until after the user has warmed up. Further, although process 600 is described as being performed by a secondary pedometer device, it is to be understood that some or all portions of the process can be performed by a primary pedometer device (i.e., a device that is to be calibrated). As described above, calibration can be performed separately for different activities, and the decision whether to calibrate (e.g., at block 614) can depend in part on the activity currently being performed.

In some embodiments, two (or more) pedometer devices can dynamically negotiate which will be the primary device (i.e., the device being calibrated) and which will be the secondary device (i.e., a source of calibration data). For instance, in embodiments where only one device has location-sensing (or distance-sensing) technology (e.g., GPS), the device that has location-sensing can be the secondary device to calibrate distance for a primary device that does not have built-in location-sensing technology. As another example, some devices may be more or less accurate than others in their measurements. For instance, a device worn on the user's wrist may be less accurate as to step count than a device worn in the user's pocket or attached to a belt. Accordingly, in some embodiments, selection of the primary device can be based on the device types, with the less reliable device type being the primary device. As another example, each device can be assigned a reliability rating (e.g., by the manufacturer), and the device having lower reliability rating can be the primary device. In some embodiments, the reliability rating can be activity dependent; for example, a wrist-worn device may be less reliable than a hip-worn device for running but more reliable for wheelchair racing. Devices can communicate to determine the device type or reliability rating of another device and compare to their own device type or reliability rating; the more reliable device can act as the secondary pedometer to calibrate the less reliable device.

Process 600 can be transparent to the user. Calibration can occur at any time when the user is performing an activity and both devices are present and able to collect data related to the activity. Consequently, the user need not know whether or when the pedometer devices perform calibration operations. In some cases, the user's lack of awareness can result in a more accurate calibration, as the user may be more likely to perform the activity normally rather than making special efforts to obtain a "good" calibration. When both devices are present and calibration is not in progress, one of the pedometers can enter a reduced-power state. For instance, in embodiments where the secondary pedometer includes a GPS receiver, the receiver can be powered off or operated at lower resolution (which reduces accuracy); distance traveled can be determined by the primary and/or secondary pedometer based on the step count and previously determined calibration parameters. Further, when both devices are present, either of the devices can provide its measurement data to the other, and the device that receives the measurement data can combine the data from both sources to produce a more accurate estimate of the activity (e.g., step count and/or distance).

In embodiments described above, calibration can occur when at least two pedometer devices are present and able to collect data related to the user's activity. In some embodiments, one pedometer device can suggest to the user to take another pedometer device along. For instance, if calibration has never been performed or has not been performed recently, primary pedometer device 502 can display a message recommending that the user take secondary pedometer device 504 along the next time the user does the activity. It should be noted that this may make the user aware that calibration is going to occur; however, if the devices determine when to initiate calibration (e.g., based on process 600), the user need not know exactly when the calibration period occurs.

Calibrating distance using a GPS receiver assumes that the user is actually changing location during the activity. This might not be true in all circumstances. For instance, if the user is running on a treadmill (or using other stationary workout equipment), the GPS position will likely stay constant (within errors). Where this occurs, calibration can still be performed as to step count or other parameters related to body movement, but calibration of distance might not be available. In some embodiments, one of the pedometer devices can be capable of communicating with the treadmill (or other workout equipment) to obtain a distance measurement, and this measurement can be used to determine a calibration parameter to convert step count to distance. Where a user works out in different environments at different times (e.g., sometimes by running on a treadmill or and sometimes by running on a road or path), calibration can be performed separately for the different environments.

Workout data, including computed step counts and/or distances, can be presented in real time during the workout by either pedometer device, e.g., on a display or via audio feedback cues. Workout data can also be stored by either pedometer (or both pedometers) for later review. For example, the user can interact with the pedometer's user interface to review a workout, or the user can transfer the workout data from the pedometer to another device (e.g., the user's computer or a cloud storage service) and use other interface devices to review the data. In embodiments where one or both of the pedometer devices include physiological sensors (e.g., as shown in FIG. 2), the stored workout data can include physiological sensor readings, and the physiological sensor data can be time-correlated with the pedometer data.

Figure 7:
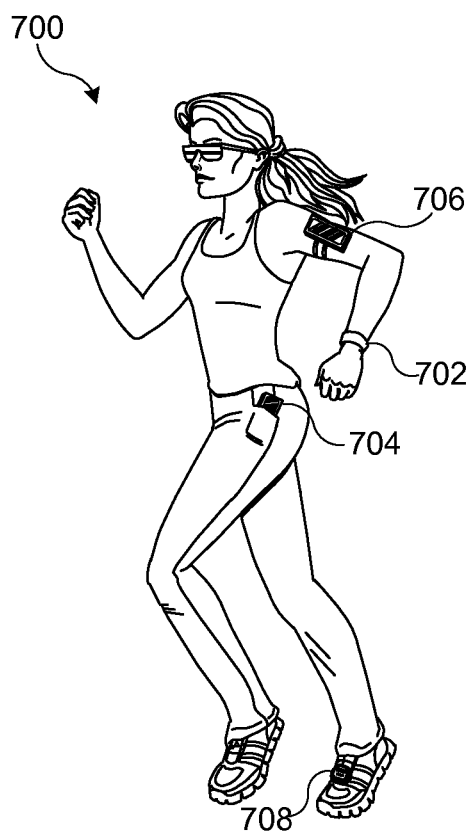
FIG. 7 shows a user wearing more than two pedometers according to an embodiment of the present invention.

Embodiments described above make use of two pedometer devices, with one device providing information usable to calibrate the other device. Other embodiments can incorporate data from more than two pedometers. For example, FIG. 7 shows a user 700 wearing more than two pedometers according to an embodiment of the present invention. Pedometer 702 can be a wrist-worn device (e.g., similar or identical to wearable device 100 described above). Pedometer 704 can be a mobile phone (e.g., similar or identical to host device 102 described above). Pedometer 706 can be a device worn on an armband, such as a small media player (which can be implemented similarly to device 102 or device 300 described above). Pedometer 708 can be a device that is incorporated into, inserted into, or attached to the user's shoe (e.g., a device with a pressure sensor and/or accelerometer and a wireless transmitter to communicate sensor data to another device such as pedometer 702, 704, or 706).

Each of pedometers 702, 704, 706, 708 can operate independently to gather data (e.g., step count). In some embodiments, one or more of pedometers 702, 704, 706, 708 can have a location sensor (e.g., a GPS receiver) and can determine the user's location at any given time. Any of pedometers 702, 704, 706, 708 can be used to calibrate any other pedometer, and in some cases a pedometer can be self-calibrating (e.g., if the pedometer also has a location sensor). For example, each pedometer can have a reliability rating based on the type of sensors used and/or the location on the body where it is likely to be worn (or is being worn). By communicating with each other, pedometers 702, 704, 706, 708 can determine a most-reliable pedometer to provide calibration data to the others. As another example, if one of the pedometers (e.g., pedometer 704) has built-in location-determining capability (e.g., a GPS receiver), that pedometer can be used to determine distance calibration parameters for any or all pedometers that do not have built-in location-determining capability.

Figure 8:
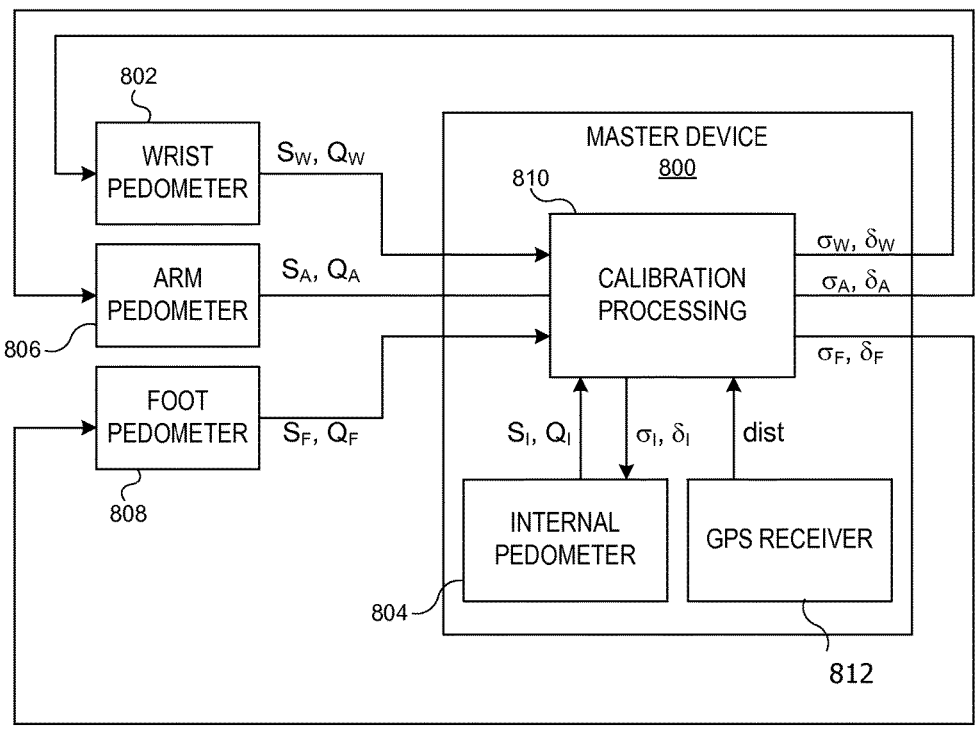
FIG. 8 is a simplified block diagram showing how data from multiple pedometer devices can be combined by a master device according to an embodiment of the present invention.

In some embodiments, when multiple pedometers are available, data from the various pedometers can be combined to more accurately determine a step count and/or distance and to provide calibration across the devices. FIG. 8 is a simplified block diagram showing how data from multiple pedometer devices can be combined by a master device 800 according to an embodiment of the present invention. In this example, wrist pedometer 802, arm pedometer 806, and foot pedometer 808 can correspond to pedometers 702, 706, and 708 of FIG. 7. Master device 800 can include its own "internal" pedometer 804. In this example, master device 800 can be a mobile phone (e.g., implemented as shown in FIG. 3), and internal pedometer 804 can correspond to pedometer 704 of FIG. 7, incorporated into a mobile phone.

Master device 800 can include a calibration processing module 810 (e.g., a processor executing calibration program code) and a transceiver module (e.g., including an RF antenna and associated circuitry) capable of communicating with external pedometers 802, 806, 808. In addition, master device 800 can include a GPS receiver 812.

In operation, while a user is performing an activity, master device 800 can receive pedometer data from external pedometers 802, 806, 808. For example, wrist pedometer 802 can provide a step count ($S_W$) and a quality parameter ($Q_W$). Step count $S_W$ can be determined from accelerometer or other motion sensor data, e.g., as described above. Quality parameter $Q_W$ can include a measure of the "noise" in the detected movement (e.g., how much the detected acceleration deviates from an expected motion pattern of a user's wrist during the activity) or any other parameter indicative of the reliability of the step count $S_W$. Similarly, arm pedometer 806 can provide a step count ($S_A$) and a quality parameter ($Q_A$), and foot pedometer 808 can provide a set count ($S_F$) and a quality parameter ($Q_F$). Internal pedometer 804 can also provide a step count ($S_I$) and a quality parameter ($Q_I$). GPS receiver 812 can provide a distance measurement (dist) or coordinates or other measurements usable to determine a distance traveled.

Calibration processing module 810 can use the data obtained from pedometers 802, 804, 806, 808 and GPS receiver 812 to determine calibration factors for each pedometer. For example, the "correct" step count ($S_0$) can be a weighted average of the step counts $S_W$, $S_A$, $S_F$, and $S_I$, with the weights being assigned based on the quality parameters $Q_W$, $Q_A$, $Q_F$, $Q_I$ such that more reliable (or less noisy) step counts are given greater weight. A separate step-count calibration factor $\sigma_W$, $\sigma_A$, $\sigma_F$, $\sigma_I$ can be determined for each of pedometers 802, 804, 806, 808 based on correcting each pedometer's step count to the correct value $S_0$. A separate distance calibration factor $\delta_W$, $\delta_A$, $\delta_F$, $\delta_I$ can be determined for each of pedometers 802, 804, 806, 808 based on the distance measured by GPS receiver 812 and either the uncorrected or corrected step count for each pedometer. These computations can be similar to computations described above with reference to FIG. 5.

Master device 800 can transmit the computed calibration parameters to each pedometer, e.g., transmitting parameters $\sigma_W$ and $\delta_W$ to wrist pedometer 802, parameters $\sigma_A$ and $\delta_A$ to arm pedometer 806, parameters $\sigma_F$ and $\delta_F$ to foot pedometer 808, and parameters $\sigma_I$ and $\delta_I$ to internal pedometer 804. Subsequently to calibration, each pedometer device can function independently as a pedometer using the calibration parameters obtained during the calibration.

In some embodiments, calibration can occur in a feedback loop over a number of cycles. In each cycle, each pedometer 802, 804, 806, 808 can use its current calibration parameters to adjust its step count and/or distance and can send the adjusted values to master device 800. Based on discrepancies, master device 800 can modify the calibration parameters so that the various pedometers yield consistent measurements after adjustment using the calibration parameters. The feedback and adjustment cycles can continue until the calibration parameter values stabilize.

It will be appreciated that the system of FIG. 8 is illustrative and that variations and modifications are possible. For example, calibration processing need not be performed in the same device that has a GPS receiver, and the device that performs calibration processing can but need not have an internal pedometer. Thus, some or all of the modules shown as part of master device 800 can be implemented in different devices, provided that data can be exchanged between the devices. Any number of pedometers can be calibrated in the manner described. In various embodiments, a user can wear zero or more pedometers at any given time, and calibration can be performed based on the combination of pedometers the user is currently wearing, provided that the user is wearing at least two pedometers and that one of the pedometers has a calibration module and is capable of communicating with the other(s). In some embodiments, calibration of step count can be performed regardless of whether a distance measurement is available, and a device that can measure distance but not step count can be used to determine a distance calibration parameter for converting another device's step count to a distance. As with other embodiments described herein, the various pedometers can store separate sets of calibration parameters associated with different activities (e.g., walking vs. running), and data from any or all of the pedometers can be used to identify the current activity of the user.

The particular calibration algorithms can also be modified. For example, in some embodiments, per-stride calibration (e.g., using Equations (1) and (2) described above) can be performed for any or all of the pedometer devices. For example, instead of just providing a step count, any of pedometers 802, 804, 806, 808 can provide accelerometer data, and master device 800 can compute weights $w_0$-$w_8$ for use in Equation (1) or other per-stride calibration parameters. In addition, calibration can be performed over a number of different calibration paths, and calibration parameters for different paths can be combined, e.g., as a weighted average based on reliability scores of the various calibration (similar to the weighted averaging described above with reference to FIG. 5).

In embodiments described herein, each pedometer device can operate independently and can determine step count and/or distance traveled using any calibration parameters it currently has stored. When the user is wearing or carrying two or more pedometer devices while performing an activity, the devices can communicate for purposes of calibration (e.g., as described above), and calibration can improve the reliability of any subsequent measurements made by a pedometer operating in standalone mode. Calibration can occur serendipitously (e.g., whenever the user happens to be wearing multiple pedometers) and transparently to the user. For example, processes similar to process 600 can be used between or among any two or more pedometer devices (including a master device as shown in FIG. 8, if present) to determine whether and when to perform calibration.

In some embodiments, a device with a pedometer and a location-determining system, such as master device 800 of FIG. 8, can operate to select appropriate calibration tracks to be used for pedometer calibration. As used herein, a "calibration track" can include a record of location and steps taken over some period of time, such as a calibration period as described above. Calibration tracks can be automatically selected, e.g., based on considerations such as time duration of the track, consistency of the user's cadence (e.g., in strides/sec), length of the track (e.g., distance traveled). In general, longer tracks with a more consistent cadence can be preferentially selected for use in calibration. Selected calibration tracks can be used to calibrate internal pedometer 804 as well as any other pedometers 802, 806, 808 that may be present during the activity. It should be noted that pedometer 804 and GPS receiver 812 are both internal to master device 800, and master device 800 can be a self-calibrating pedometer (that is, a pedometer that can be calibrated without using another device), in addition to serving as a calibration partner for external pedometers 802, 806, 808.

As noted above, when and whether calibration is occurring can be transparent to the user. As part of achieving such transparency, it may be desirable to automatically activate GPS receiver 812 when the user is likely to generate a calibration track. In principle, GPS receiver 812 can be continuously active. However, in practice, GPS receiver 812 consumes power when active, and selectively activating GPS receiver 812 can reduce power consumption. Accordingly, in some embodiments, master device 800 can determine when the user appears to be engaged in a sustained locomotion activity (e.g., walking, running, or jogging) and can activate GPS receiver 812 when a sustained locomotion activity is in progress and calibration is desired.

Figure 9:
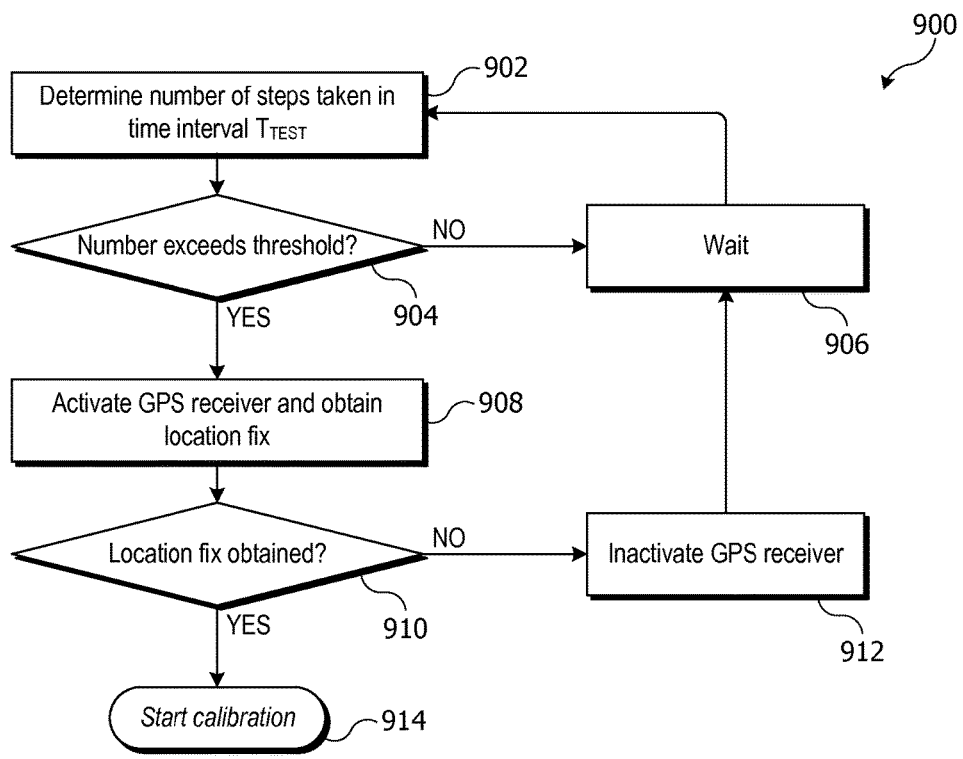
FIG. 9 is a flow diagram of a process 900 for determining when to start calibration according to an embodiment of the present invention.

FIG. 9 is a flow diagram of a process 900 for determining when to activate a GPS receiver and start a calibration period according to an embodiment of the present invention. Process 900 can be performed, e.g., in master device 800 of FIG. 8 or any other device with real-time access to pedometer step-count data and location information. In some embodiments, process 900 can receive real-time information about steps counted by a pedometer (e.g., internal pedometer 804 of master device 800) and can be performed continuously. In other embodiments, process 900 can be initiated, e.g., when the pedometer begins to detect steps or when other components of master device 800 detect the onset of a locomotion activity. For example, an activity classifier algorithm can be used to identify a current activity of the user, and process 900 can be initiated when the activity classifier identifies a locomotion activity. It is assumed that when process 900 begins, GPS receiver 812 (or other location-determining systems) is in an inactive state (e.g., powered off or in a low-power state); however, those skilled in the art will appreciate that process 900 can be used to start a calibration period even if GPS receiver 812 is already in an active state.

At block 902, process 900 can determine a number of steps taken over a prescribed time interval $T_{TEST}$. In some embodiments, $T_{TEST}$ is selected to screen out "false positive" situations in which the user engages in a short burst of activity, such as walking down the hall or running across the street, rather than a sustained activity suitable for calibrating a pedometer. For example, time interval $T_{TEST}$ can be, e.g., 60 seconds, 90 seconds, 120 seconds, or another interval. The number of steps taken during time interval $T_{TEST}$ can be determined, e.g., based on step count data supplied by internal pedometer 804.

At block 904, the number of steps taken during time interval $T_{TEST}$ can be compared to a prescribed threshold. The threshold can be chosen to be at or near a minimum number of steps that would be expected on the assumption that the user sustained the locomotion activity throughout the time interval $T_{TEST}$. For example, the threshold can be 100 steps in 2 minutes, a cadence consistent with 2 minutes of continuous walking. In some embodiments, the threshold can be based in part on the specific form of locomotion; for instance, a higher threshold might be applied if an activity classifier (or other information) indicates that the user is running rather than walking.

If the number of steps does not exceed the threshold, process 900 can wait at block 906 and check again at a later time. The time to wait can be selected as desired, and in some embodiments, process 900 can examine contiguous or overlapping time windows of duration $T_{TEST}$ to detect when the step count exceeds the threshold.

If, at block 904, the number of steps taken exceeds the threshold, then GPS receiver 2 can be activated at block 908, and GPS receiver 812 can attempt to establish a location fix. Establishing a location fix can be performed using standard GPS algorithms, and GPS receiver 812 can report a location and an associated error estimate indicating how reliable the location fix is.

At block 910, if a location fix cannot be established, or if the error estimate is too large (e.g., greater than 10 meters or greater than 50 meters or the like), process 900 can inactivate GPS receiver 812 at block 912 and return to block 906 to wait and try again.

If, at block 910, a location fix of acceptable quality is established, process 900 can end and calibration can begin at block 914. In some embodiments, at block 914, master device 800 can send a signal to internal pedometer 804 and/or any or all of external pedometers 802, 806, 808 indicating that calibration is beginning. This can correspond to block 510 of process 500 described above.

It will be appreciated that process 900 is illustrative and that variations and modifications are possible. Steps described as sequential may be executed in parallel, order of steps may be varied, and steps may be modified, combined, added or omitted. Other location-determining technology can be substituted for GPS receiver 812. Location information can be generated internally to the device that performs process 900 or received from an external device, provided that the external device is also located on the user's person or is otherwise capable of reliably reporting the user's location. Step count information can be provided by an internal or external pedometer. In some embodiments, process 900 or similar processes can be used to initiate calibration opportunistically, with no user intervention and without the user being alerted to whether or when calibration is being initiated.

Figure 10:
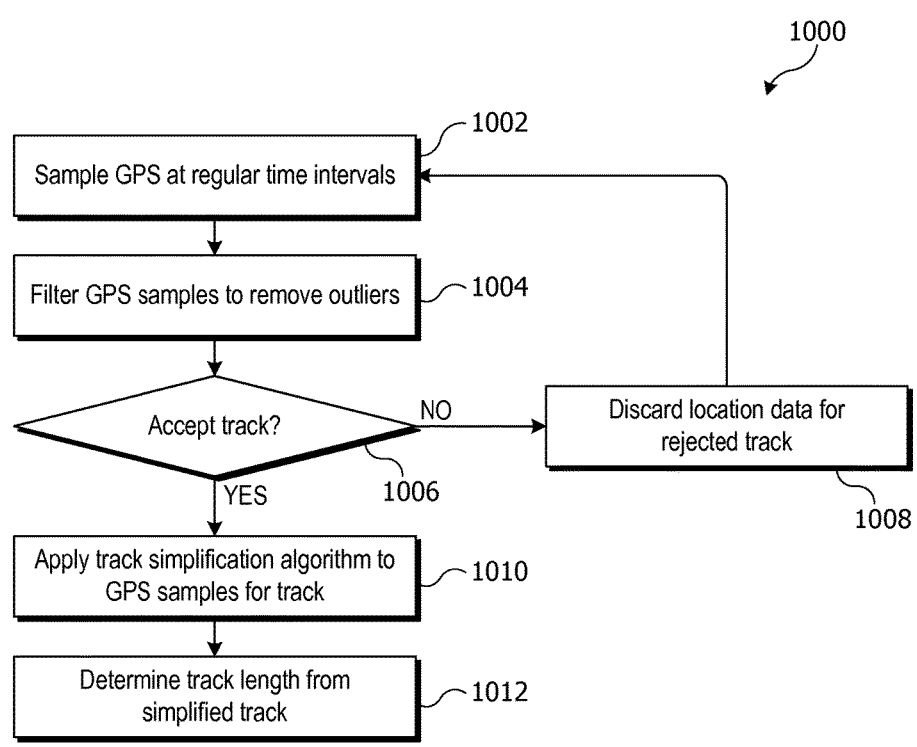
FIG. 10 is a flow diagram of a process 1000 that can be used for selection of a calibration track according to an embodiment of the present invention.

As noted above, in some embodiments, calibration can be based on detection of a calibration track, which can be selected opportunistically, based on characteristics of collected step-count and location data. FIG. 10 is a flow diagram of a process 1000 that can be used for selection of a calibration track according to an embodiment of the present invention. Process 1000 can be executed, e.g., in master device 800 or in any other device that has access to time-correlated location and step count information. Process 1000 can be executed in real time, e.g., while the user is engaged in a locomotion activity, or after the fact using stored data.

Process 1000 can begin when calibration is in progress, e.g., as determined using process 900 described above. At this stage, GPS receiver 812 can be in its active state and tracking the user's location while a pedometer to be calibrated (e.g., internal pedometer 804 and/or any of external pedometers 802, 806, 808) is counting the user's steps.

At block 1002, process 1000 can sample the GPS location data at regular time intervals. Each sample can include a current location fix and an associated error estimate. The sampling interval can be chosen to balance the desire for a precisely known track against inherent accuracy limits of GPS technology and the correlation between sampling rate and power consumption in a GPS receiver. For typical locomotion activities, a sampling rate of 1 Hz can be sufficient, although a higher or lower rate can also be used.

At block 1004, the GPS samples can be filtered to remove any outliers. Outliers can be identified, e.g., using standard statistical techniques to identify samples that, in the context of preceding and subsequent samples, are implausible given the physical constraints of human locomotion.

At block 1006, a determination can be made as to whether a set of GPS samples that survive filtering at block 1004 provides an acceptable calibration track. The determination of acceptability can be made using a combination of statistical criteria that reflect whether the user moved at a consistent rate along the track and how accurately the length of the track can be determined. One criterion for consistent rate of motion can be based on consistency of the user's cadence over the temporal duration of the track. For example, an average cadence (e.g., steps per second) can be computed from the pedometer data collected over the duration of the track, and a standard deviation of the cadence can also be determined. A large standard deviation may indicate that the user did not move consistently along the track and that the track is therefore less reliable. One criterion for accuracy of track length can be based on the error estimates of the GPS samples. For example, it can be required that all GPS samples (after removing outliers at block 1004) have error estimates less than an upper limit (e.g., 10 meters) or that at least 90% of the samples have error estimates less than the upper limit or the like. Other criteria can also be used.

If, at block 1006, the track is not accepted, then at block 1008, the GPS samples associated with the track can be discarded. Discarding location-tracking information as soon as it is determined not to be useful is not required but can help to protect user privacy. (Pedometer data such as step counts and/or distance estimates collected during the time period corresponding to the track can be retained, e.g., as part of the normal accumulation of workout data.) Assuming the user is still moving, process 1000 can return to block 1002 to continue searching for an acceptable calibration track. The search can continue until a track is accepted at block 1006 or until some other condition occurs that terminates the search. Examples of such conditions can include the user discontinuing the locomotion activity, GPS receiver 812 losing its fix (in which case, process 900 can be used again to determine whether a new fix can be acquired), or other conditions as desired.

If, at block 1006, the calibration track is accepted, then further analysis can be performed. For example, at block 1010, a track simplification algorithm can be applied to the GPS samples of the calibration track. In general, GPS tracks (sequences of samples) for a moving object can be subject to "meander" (fluctuations in a direction transverse to the actual line of travel) due to limitations on the accuracy of the technology. If track length is computed by simply adding up the distances between consecutive GPS samples, meander can introduce a systematic bias toward overestimating the distance the user traveled, which can adversely affect calibration. A track simplification algorithm can be used to reduce meandering. The algorithm can, for example, selectively remove certain points from the GPS track to reduce meander and improve fidelity to the actual motion path; for instance, path features such as turning a corner or crossing to the other side of a street can be preserved. Examples of track simplification algorithms to reduce meander in GPS tracks are known in the art, and any such algorithm can be used at block 1010.

At block 1012, a track length can be determined from the simplified track, e.g., by adding up the distances between consecutive GPS sample locations in the track. This can be used as the total distance traveled during the calibration period. The computation of calibration parameters can proceed, e.g., as described above with reference to FIG. 5 or as described below with reference to FIG. 11. In some embodiments, if the track length computed at block 1012 is below a lower limit, the track can be discarded as being too short.

It will be appreciated that process 1000 is illustrative and that variations and modifications are possible. Steps described as sequential may be executed in parallel, order of steps may be varied, and steps may be modified, combined, added or omitted. Different criteria for selecting calibration tracks can be used. In general, more stringent criteria can result in fewer, although generally more reliable, calibration tracks being selected, and the choice of selection criteria can involve tradeoffs between quantity and quality of data. In some embodiments, e.g., where new calibration tracks are used to update existing calibration parameters (rather than replacing them), the selection criteria can shift over time to become more stringent as the quality of the existing calibration parameters improves.

Figure 11:
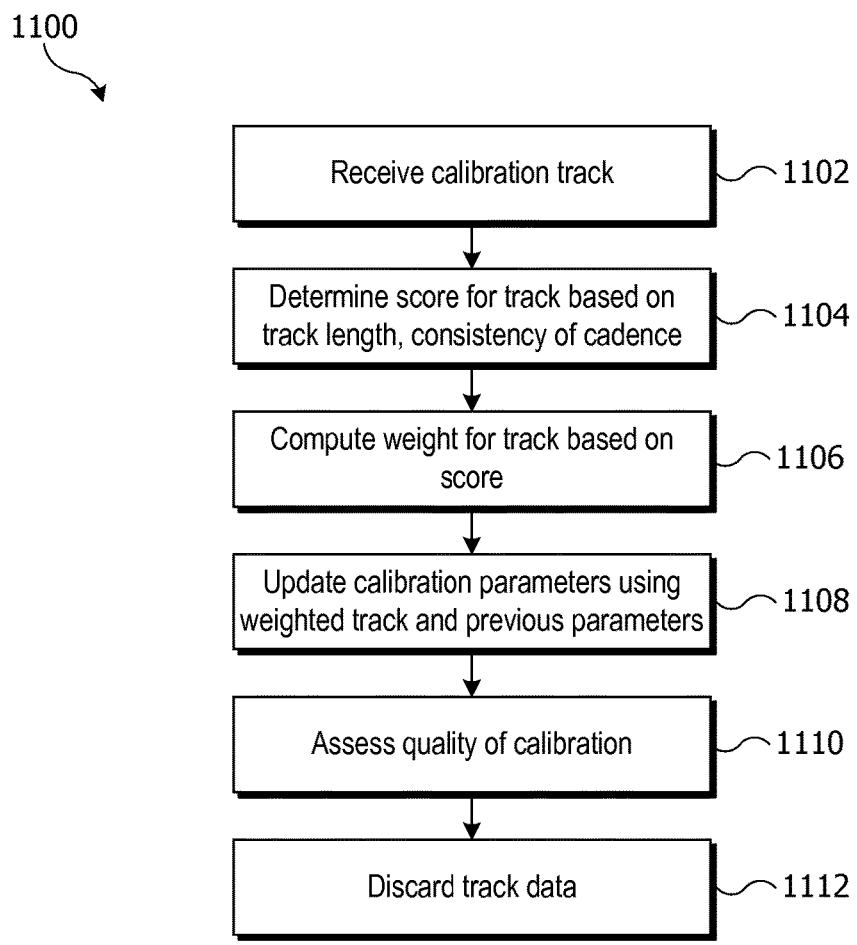
FIG. 11 is a flow diagram of a process 1100 for using a calibration track (e.g., a track selected using process 1000) to update calibration parameters according to an embodiment of the present invention.

FIG. 11 is a flow diagram of a process 1100 for using a calibration track (e.g., a track selected using process 1000) to update calibration parameters according to an embodiment of the present invention. Process 1100 can be implemented, e.g., in master device 800 of FIG. 8 or any other device that computes calibration parameters. Calibration-track and/or step-count inputs can be generated locally or received from another device as desired.

Process 1100 can begin at block 1102, when master device 800 receives or identifies a calibration track (e.g., using process 1000). At this stage, master device 800 can have an existing set of calibration parameters, which can initially be a default set (e.g., based on assumptions or collected data about the user such as height, gender, etc.). Over time, the default set of calibration parameters can evolve based on measured calibration tracks, e.g., through repeated execution of process 1100.

At block 1104, process 1100 can assign a score to the received calibration track. The score can be based on track length (e.g., as determined at block 1012 of process 1000) and consistency of the user's cadence. Other inputs, such as the average quality of the GPS samples in the calibration track, can also be used. In some embodiments, the scoring formula is designed such that longer tracks and more consistent cadence each generate higher scores, and in some instances shorter tracks and less consistent cadence can have negative effects on the score. In some embodiments, a track can be discarded at this stage if its score is below a minimum threshold score.

At block 1106, a weight for the track can be computed from the score. In some embodiments, the weight can be the score, or a value proportional to the score. Other computations of track weight can also be used. In some embodiments, mathematical formulas for assigning scores and/or weights to calibration tracks can be developed heuristically (e.g., based on controlled studies used to assess the quality of calibration for tracks having different characteristics).

At block 1108, the existing set of calibration parameters can be updated using the weighted calibration track. Updating of a set of calibration parameters can proceed as described above. For example, a set of "new" calibration parameters can be computed using the calibration track (e.g., using any of the techniques described above with reference to FIG. 5). The new set of calibration parameters can then be combined with the existing set of calibration parameters. The combination can use a weighted averaging technique based on the weight assigned to the new track and a quality weight associated with the existing set of calibration parameters (which can be determined as described below). In this manner, the effect of any one calibration track on the calibration parameters can be limited, and higher-quality tracks can have a larger effect than lower-quality tracks.

At block 1110, an assessment of the quality of the calibration can be made. For example, an estimate of the track length for the calibration track can be computed using the updated set of calibration parameters from block 1108 and compared to the "true" track length determined for the calibration track (e.g., at block 1012 of process 1000). This assessment can result in assigning a quality weight to the updated set of calibration parameters. On the next iteration of process 1100, this quality weight can be used at block 1108 to combine the existing set of calibration parameters with the new set of calibration parameters.

At block 1112, the GPS sample data for the calibration track can be discarded. Discarding location-tracking information associated with calibration tracks once calibration is complete is not required but can help to protect user privacy. The updated set of calibration parameters is preserved, but specific calibration tracks would generally not be derivable from a set of calibration parameters. (Pedometer data such as step counts and/or distance estimates collected during the time period corresponding to the track can also be retained, e.g., as part of the normal accumulation of workout data.)

It will be appreciated that process 1100 is illustrative and that variations and modifications are possible. Steps described as sequential may be executed in parallel, order of steps may be varied, and steps may be modified, combined, added or omitted. For instance, different algorithms for weighting calibration tracks and computing calibration parameters can be used, and different techniques for combining a new set of calibration parameters with an existing set can be used. In some embodiments, there might initially be no calibration data (e.g., when a pedometer is brand new), in which case the first set of calibration parameters determined (regardless of quality) can become a starting set of calibration parameters that are refined over time through subsequent iterations of process 1100. In other embodiments, a default set of calibration parameters can be provided to initialize the device prior to actual calibration; the default set can be based on statistical averages of human locomotion and can be adapted to the height, gender, weight, age, and/or other characteristics of the user to the extent these are known. The default set of calibration parameters can be assigned a relatively low quality weight so that the device can quickly adapt its calibration to match the user's actual locomotion.

As noted above, users can engage in different types of locomotion activity at different times, and a pedometer can maintain a separate set of calibration parameters for each type of locomotion activity. Calibration processes described above can be executed for each type of locomotion activity whenever the user engages in that activity.

In some embodiments where a device has both a pedometer and a GPS receiver (e.g., maser device 800 of FIG. 8), a quality weight assigned to the calibration parameters (e.g., at block 1110 of FIG. 11) can be used to determine when and/or how much to rely on the GPS receiver. For example, if a high quality calibration is available, location determination while the user is engaged in a locomotion activity can be done in part (or entirely) using dead reckoning techniques based on pedometer data. The GPS receiver can be powered off or used with a lower resolution setting, thereby reducing power consumption in the device.

In addition, the frequency with which calibration operations (e.g., any or all of the operations described above) are performed can be reduced when a high-quality calibration is available, and this can further reduce power consumption by the device.

In general, step detection, stride estimation (determining number of strides and/or length of each stride), and other aspects of accelerometer-based pedometry can depend not only on the activity but also on where on the user's body a particular pedometer is worn, as different parts of the body can experience different accelerations during a given locomotion activity. Some pedometers may be designed specifically to be worn at a particular location on the body. For instance, it can be plausibly assumed that an in-shoe pedometer would be worn on the user's foot, and that a pedometer attached to or built into a wrist band would be worn on the user's wrist. For other types of pedometers, however, an assumption as to on-body location might not be appropriate. For instance, a mobile phone or similarly sized device that has a built-in pedometer can be placed at or near the user's waist, e.g., by placing it in a pocket (as shown for pedometer 704 in FIG. 7) or clipping it to a belt or waistband. A mobile phone can also be worn on an armband on the user's upper arm (similarly to pedometer 706 in FIG. 7) or lower arm, or it can be carried in the user's hand.

A pedometer that can be worn (or carried) in different on-body locations can support multiple different algorithms for step detection and stride length estimation, with algorithms being selected on a case-by-case basis depending on both the specific locomotion activity and the on-body location of the pedometer. A separate set of calibration parameters can be maintained for each combination of locomotion activity and on-body location. In operation, the pedometer can determine the locomotion activity and on-body location, then select the appropriate algorithms and set of calibration parameters.

In principle, on-body location can be determined by prompting the user to indicate where a pedometer is being worn. In practice, it may be desirable to avoid burdening the user with responding to a prompt. Accordingly, in some embodiments of the present invention a pedometer can automatically determine its on-body location as well as the locomotion activity.

Figure 12:
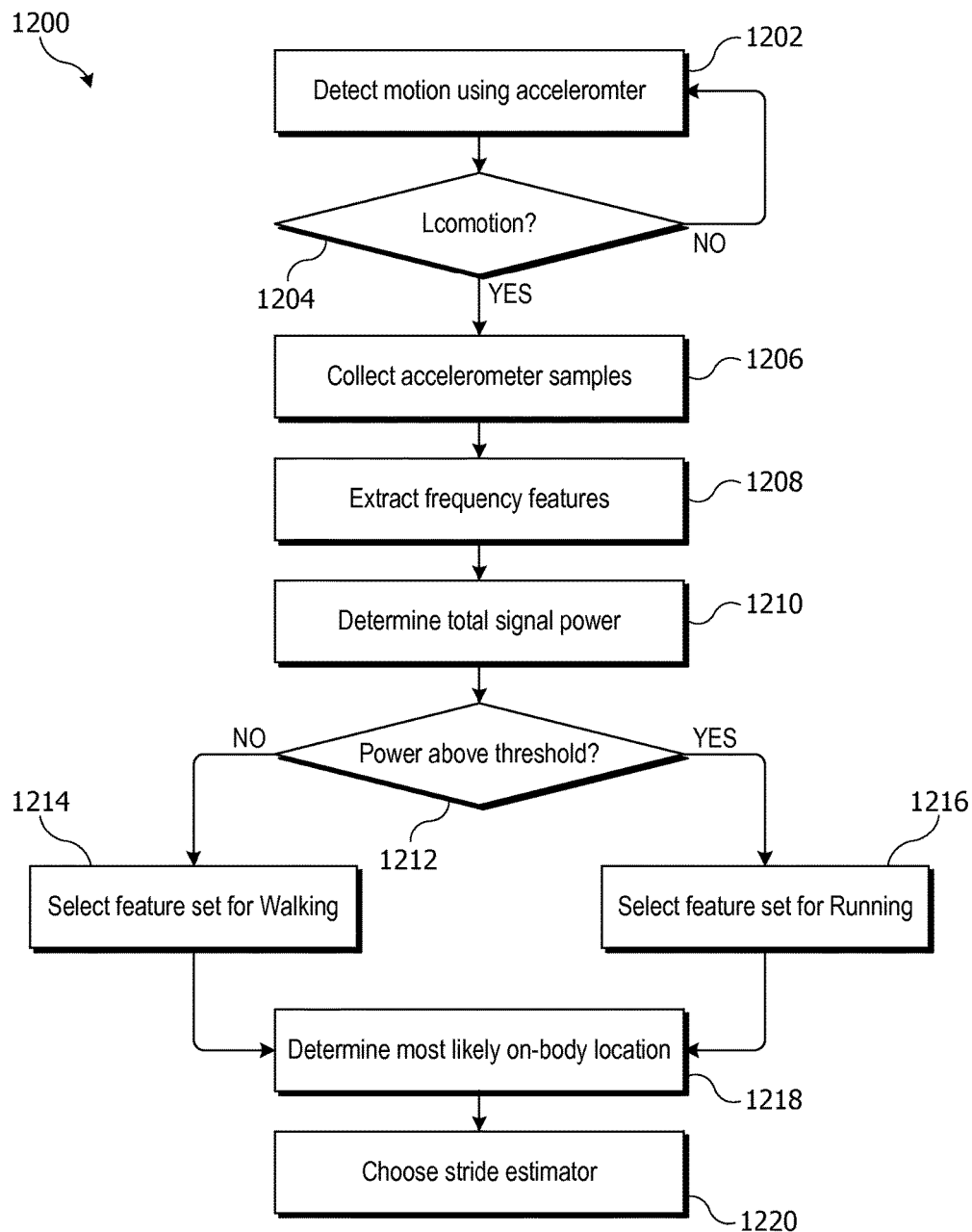
FIG. 12 is a flow diagram of a process 1200 for automatically selecting a stride estimation algorithm (and the corresponding set of calibration parameters) according to an embodiment of the present invention.

FIG. 12 is a flow diagram of a process 1200 for automatically selecting a stride estimation algorithm (and the corresponding set of calibration parameters) according to an embodiment of the present invention. Process 1200 can be performed, e.g., in any of the pedometer devices described above.

At block 1202, process 1200 can detect motion of the user, e.g., using an onboard accelerometer. At block 1204, process 1200 can determine whether the motion indicates a locomotion activity (e.g., walking or running) For instance, an activity classifier or other analysis techniques can be used. If a locomotion activity is not indicated, process 1200 can return to block 1202; thus, process 1200 can be continually monitoring the user's activity to detect the beginning of locomotion.

At block 1206, when the motion data indicates a locomotion activity, process 1200 can collect accelerometer data samples for analysis. In some embodiments, process 1200 can use a window of recently collected samples rather than waiting for additional samples.

At block 1208, process 1200 can analyze the accelerometer data to extract frequency features. For instance, block 1208 can include performing a Fast Fourier Transform or similar algorithm to extract frequency features from a set of time-based samples. At block 1210, process 1200 can determine a total signal power based on the frequency features.

At block 1212, process 1200 can determine whether the total signal power exceeds a threshold. The threshold can be chosen to distinguish walking from running, and a suitable threshold can be determined (e.g., prior to implementing process 1200) by asking a training set of users to walk and run at different times while wearing devices with accelerometers at various on-body locations, then analyzing the accelerometer data for the known actions to identify a threshold that reliably distinguishes walking from running.

If, at block 1212, the total signal power is below the threshold, then at block 1214, process 1200 can select a set of frequency features associated with walking (or more generally with low-speed and/or low-impact locomotion). If, at block 1212, the total signal power is above the threshold, then at block 1216, process 1200 can select a set of frequency features associated with running (or more generally with high-speed and/or high-impact locomotion).

The feature sets can include any features of accelerometer data. In some embodiments, the features are frequency features, but other embodiments can use time features or a combination of time and frequency features. In one embodiment, the feature set for walking can include: a relative signal power in a low frequency band (e.g., 0-2 Hz); a relative signal power in a high frequency band (e.g., 8-50 Hz); and a ratio of signal power on the x and y axes in the low frequency band. In one embodiment, the feature set for running can include: a relative signal power in a low frequency band (e.g., 0-2 Hz); a relative signal power in a middle frequency band (e.g., 2-8 Hz); and a ratio of signal power on the x and y axes in the low frequency band. In these examples, the x and y axes can be defined relative to the device. For instance, if the device has a screen, the x and y axes can be in the plane of the screen, with x corresponding to a horizontal screen dimension and y corresponding to a vertical screen dimension. Other feature sets can also be used.

At block 1218, the selected features can be analyzed to determine the most likely on-body location. In some embodiments, the analysis can be based on a machine-learning algorithm (e.g., an artificial neural network or the like) that has previously been trained using training data. The training data can be obtained, e.g., by having users perform walking and/or running activities while wearing or carrying the device at a known on-body location, such as at the waist, on the upper arm, on the lower arm (forearm), or in the user's hand. Using the training data, the machine-learning algorithm can be trained to compute a likelihood score for each on-body location, such that the likelihood score is reliably highest for the true on-body location. Algorithms for walking and running (or more generally for different locomotion activities) can be trained separately. Once trained, the appropriate algorithm (e.g., depending on whether the user is walking or running, as determined at block 1212) can be deployed at block 1218 to analyze the accelerometer data from an unknown on-body location and to identify the on-body location with the maximum likelihood score. At block 1220 the appropriate stride estimation algorithm and associated set of calibration parameters can be chosen for the activity type and on-body location.

It will be appreciated that process 1200 is illustrative and that variations and modifications are possible. Steps described as sequential may be executed in parallel, order of steps may be varied, and steps may be modified, combined, added or omitted. The particular algorithms, feature sets, and combinations of activity type and on-body locations that are distinguishable can be varied as desired and can include more or fewer activity types and/or more or fewer on-body locations.

While the invention has been described with respect to specific embodiments, one skilled in the art will recognize that numerous modifications are possible. For example, in some embodiments, a primary pedometer (which is being calibrated) can be wrist-worn while a secondary pedometer (which provides data to facilitate calibration of the primary pedometer) can be a mobile device such as a phone that is carried or worn on the user's clothing during a workout. In other embodiments, the roles can be reversed, and a wearable pedometer device can be used to calibrate a pedometer device that is carried. Further, the primary and secondary pedometers can be any two discrete electronic devices that have the ability to measure or otherwise determine activity data such as step count and/or distance traveled. Further still, some pedometers that have location-determining technology (e.g., a GPS receiver) can be self-calibrating, and in such cases use of a second device is not required.

As noted above, calibration can occur at any time when the user is wearing or carrying a pedometer device during a locomotion activity. In some embodiments, when the user acquires a new pedometer device that is not self-calibrating, instructions can be provided indicating that for best results, the user should take along a second pedometer device at least once while doing an activity in order to enable calibration of the new pedometer device. It should also be understood that if a pedometer and a location-determining unit (e.g., GPS receiver) are present in the same device, as is the case for master device 800 of FIG. 8, a pedometer can be self-calibrating, and taking two devices is not required to achieve calibration.

Embodiments described above may make reference to specific activities such as walking or jogging or running, which are examples of locomotion activities appropriate for pedometry. Those skilled in the art with access to the present disclosure will recognize that similar techniques can be applied to a variety of other locomotion activities, which can include any activity by which users can propel themselves through space or simulate propelling themselves through space using stationary workout equipment. For instance, a user might be roller skating or ice skating, rather than walking, jogging, or running. As another example, the user can be cycling, and pedometers can be worn or carried at a location on the user's body where the rotational motion of pedaling can be detected. In this example, converting rotations to distance can include obtaining information pertaining to the cycle, such as gear ratios and current gear selection, wheel diameter, or the like.

In other examples, users can use their arms to propel themselves in activities such as rowing, swimming, wheelchair racing, or the like. In the case of swimming or other water-based activities, any electronic device carried or worn by the user during the activity can be made waterproof, either by design or by encasing the device in a removable waterproof protector. Where arms are used for propulsion, arm strokes can be treated as steps; the primary pedometer can use motion-sensor data to determine arm strokes as a "step count" and can be calibrated to convert accelerometer data and/or a step count based on arm strokes to distance using techniques similar to those described above. In such activities, a wrist-worn device may be more reliable as to detecting steps than a device worn on the user's hip or foot.

The foregoing description may make reference to specific examples of a wearable device (e.g., a wrist-worn device) and/or a host device (e.g., a mobile phone). It is to be understood that these examples are illustrative and not limiting; other devices can be substituted and can implement similar functional blocks and/or algorithms to perform operations described herein and/or other operations. Further, while GPS technology is referenced as a specific example of location-determining technology that can be used to calibrate a pedometer, other technologies can be substituted, provided that that the location-determining technology is capable of reliably estimating distance covered by a user in a manner that is independent of the pedometer that is being calibrated. For instance, some indoor environments may support indoor location determining systems, and a pedometer device can leverage such systems to define a calibration track and perform calibration operations as described herein.

Embodiments of the present invention, e.g., in methods, apparatus, computer-readable media and the like, can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors)

to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present invention may be encoded and stored on various computer readable storage media; suitable media include magnetic disk or tape, optical storage media such as compact disk (CD) or DVD (digital versatile disk), flash memory, and other non-transitory media. Computer readable media encoded with the program code may be packaged with a compatible electronic device, or the program code may be provided separately from electronic devices (e.g., via Internet download or as a separately packaged computer-readable storage medium).

Thus, although the invention has been described with respect to specific embodiments, it will be appreciated that the invention is intended to cover all modifications and equivalents within the scope of the following claims.

What is claimed is:

1. A method for calibrating a pedometer device, the method comprising:
   detecting, by the pedometer device, a sustained locomotion activity in progress;
   activating, by the pedometer device, a Global Positioning System (GPS) receiver to obtain a location fix;
   determining, by the pedometer device, whether the location fix is reliable;
   initiating, by the pedometer device, a calibration process that uses data from the GPS receiver in response to determining that the location fix is reliable, wherein the calibration process includes:
      obtaining GPS samples at regular intervals;
      collecting, concurrently with obtaining the GPS samples, pedometer data including a time sequence of accelerometer data samples and step data indicating steps taken by a user;
      defining a calibration track based on the GPS samples;
      assigning a weight to the calibration track based at least in part on a location quality metric determined from the GPS samples and a cadence quality metric determined from the pedometer data; and
      computing a new set of calibration parameters from the calibration track and the pedometer data; and
   inactivating, by the pedometer device, the GPS receiver in response to determining that the location fix is not reliable.

2. The method of claim 1 further comprising, subsequently to inactivating the GPS receiver:
   waiting for a prescribed period of time; and
   in the event that the sustained locomotion activity continues beyond the prescribed period of time, reactivating the GPS receiver to obtain another location fix.

3. The method of claim 1 wherein the calibration process further includes:
   updating an existing set of calibration parameters based on the new set of calibration parameters, the weight assigned to the calibration track, and a quality weight determined for the existing set of calibration parameters.

4. The method of claim 3 further comprising:
   determining a quality weight for the updated set of calibration parameters based on the calibration track.

5. The method of claim 1 wherein the new set of calibration parameters includes a plurality of parameters usable to convert a time sequence of accelerometer data samples to a distance value.

6. An electronic device comprising:
   a Global Positioning System (GPS) receiver module;
   an accelerometer;
   a storage medium; and
   a processing subsystem coupled to the GPS receiver module, the accelerometer, and the storage medium, the processing subsystem being configured to:
      detect, based at least in part on signals from the accelerometer, a sustained locomotion activity in progress;
      activate the GPS receiver module to obtain a location fix;
      determine whether the location fix is reliable;
      initiate a calibration process that uses data from the GPS receiver module in response to determining that the location fix is reliable, wherein the calibration process includes:
         obtaining GPS samples at regular intervals;
         collecting, concurrently with obtaining the GPS samples, pedometer data including a time sequence of accelerometer data samples and step data indicating steps taken by a user;
         defining a calibration track based on the GPS samples;
         assigning a weight to the calibration track based at least in part on a location quality metric determined from the GPS samples and a cadence quality metric determined from the pedometer data; and
         computing a new set of calibration parameters from the calibration track and the pedometer data; and
      inactivate the GPS receiver module in response to determining that the location fix is not reliable.

7. The electronic device of claim 6 wherein the processing subsystem is further configured to:
   wait for a prescribed period of time subsequently to inactivating the GPS receiver module; and
   reactivate the GPS receiver module to obtain another location fix in the event that the sustained locomotion activity continues beyond the prescribed period of time.

8. The electronic device of claim 6 wherein the processing subsystem is further configured to:
   identify the locomotion activity in which a user is engaged; and
   store the new set of calibration parameters in the storage medium in association with an identifier of the locomotion activity.

9. The electronic device of claim 8 wherein the processing subsystem is further configured to identify the locomotion activity based on data received from the accelerometer.

10. The electronic device of claim 8 wherein the processing subsystem is further configured to store a plurality of sets of calibration parameters in the storage medium, each set of calibration parameters being associated with an identifier of a different one of a plurality of locomotion activities.

11. The electronic device of claim 10 wherein the plurality of locomotion activities includes at least two of walking, jogging, running, swimming, wheelchair racing, or rowing.

12. The electronic device of claim 8 wherein the processing subsystem is further configured to:
   identify an on-body location of the electronic device during the locomotion activity; and store the new set of calibration parameters in the storage medium in association with an identifier of the locomotion activity and an identifier of the on-body location.

13. The electronic device of claim 12 wherein the processing subsystem is further configured to identify the on-body location based on data received from the accelerometer.

14. The electronic device of claim 12 wherein the processing subsystem is further configured to store a plurality of sets of calibration parameters in the storage medium, each set of calibration parameters being associated with an identifier of a different one of a plurality of locomotion activities and an identifier of a different one of a plurality of on-body locations.

15. The electronic device of claim 14 wherein the plurality of on-body locations includes at least two of a waist location, an upper arm location, a lower arm location, and a hand location.

16. A non-transitory computer readable storage medium having stored thereon program instructions that, when executed by a processing subsystem in an electronic device, cause the processing subsystem to perform a method comprising:
  detecting, based at least in part on accelerometer data received at the electronic device, a sustained locomotion activity in progress;
  activating a Global Positioning System (GPS) receiver to obtain a location fix for the electronic device;
  determining whether the location fix is reliable;
  initiating a calibration process that uses data from the GPS receiver in response to determining that the location fix is reliable, wherein the calibration process includes:
    obtaining GPS samples at regular intervals;
    collecting, concurrently with obtaining the GPS samples, pedometer data including a time sequence of accelerometer data samples and step data indicating steps taken by a user;
    defining a calibration track based on the GPS samples;
    assigning a weight to the calibration track based at least in part on a location quality metric determined from the GPS samples and a cadence quality metric determined from the pedometer data; and
  computing a new set of calibration parameters from the calibration track and the pedometer data; and
  inactivating the GPS receiver in response to determining that the location fix is not reliable.

17. The non-transitory computer readable storage medium of claim 16 wherein the method further comprises:
  subsequently to inactivating the GPS receiver, waiting for a prescribed period of time; and
  in the event that the sustained locomotion activity continues beyond the prescribed period of time, reactivating the GPS receiver to obtain another location fix.

* * * * *